(12) United States Patent
Hara et al.

(10) Patent No.: US 11,237,746 B2
(45) Date of Patent: Feb. 1, 2022

(54) STORAGE SYSTEM AND NODE MANAGEMENT METHOD

(71) Applicant: HITACHI, LTD., Tokyo (JP)

(72) Inventors: Akihiro Hara, Tokyo (JP); Norio Shimozono, Tokyo (JP); Tomohiro Kawaguchi, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 82 days.

(21) Appl. No.: 16/810,128

(22) Filed: Mar. 5, 2020

(65) Prior Publication Data

US 2021/0034268 A1    Feb. 4, 2021

(30) Foreign Application Priority Data

Jul. 29, 2019    (JP) .............................. JP2019-139222

(51) Int. Cl.
*G06F 3/06* (2006.01)

(52) U.S. Cl.
CPC .......... *G06F 3/0644* (2013.01); *G06F 3/0604* (2013.01); *G06F 3/0683* (2013.01)

(58) Field of Classification Search
CPC ..... G06F 3/0644; G06F 3/0604; G06F 3/0683
See application file for complete search history.

(56) References Cited

U.S. PATENT DOCUMENTS

| | | | |
|---|---|---|---|
| 6,820,171 B1 * | 11/2004 | Weber ................... | G06F 3/0626 711/114 |
| 7,571,154 B2 * | 8/2009 | Emeis ................... | G06F 9/5044 |
| 9,077,580 B1 * | 7/2015 | Randhawa .......... | H04L 67/1023 |
| 9,910,742 B1 * | 3/2018 | Faibish ................ | G06F 3/0685 |
| 10,282,136 B1 * | 5/2019 | Ito ........................ | G06F 11/2094 |
| 10,430,723 B1 * | 10/2019 | Tzur ..................... | G06F 3/0649 |
| 2012/0047346 A1 * | 2/2012 | Kawaguchi .......... | G06F 12/0223 711/165 |
| 2014/0380007 A1 * | 12/2014 | Suen ....................... | G06F 3/064 711/162 |
| 2016/0085481 A1 * | 3/2016 | Antony ................. | G06F 16/185 718/1 |
| 2019/0332261 A1 * | 10/2019 | Fukatani ............... | G06F 3/0631 |

FOREIGN PATENT DOCUMENTS

| | | |
|---|---|---|
| JP | 2012-043407 A | 3/2012 |
| WO | 2003/063423 A1 | 7/2003 |

OTHER PUBLICATIONS

Japanese Office Action dated May 18, 2021 for Japanese Patent Application No. 2019-139222.

* cited by examiner

*Primary Examiner* — Ryan Bertram
(74) *Attorney, Agent, or Firm* — Volpe Koenig

(57) ABSTRACT

In a storage system, attributes of nodes are specified as first attribute nodes and second attribute nodes, the I/O processing in the nodes is executed as a plurality of processes including front-end I/O processing executed by any of the first attribute nodes and back-end I/O processing executed by the first and second attribute nodes having a storage device that stores data relating to the I/O processing.

16 Claims, 22 Drawing Sheets

121

| NODE ID /1211 | ATTRIBUTE /1212 | STARTUP PROGRAM /1213 |
|---|---|---|
| 1 | MANAGEMENT | FE I/O PROCESSING PROGRAM, BE I/O PROCESSING PROGRAM, STORAGE DEVICE MANAGEMENT PROGRAM, NODE MANAGEMENT PROGRAM, CLUSTER CONFIGURATION MANAGEMENT PROGRAM, TIER CONTROL PROGRAM, STORAGE AREA CREATION/DELETION PROGRAM, STORAGE AREA MANAGEMENT PROGRAM, VOLUME MANAGEMENT PROGRAM, POOL MANAGEMENT PROGRAM |
| 2 | NORMAL | FE I/O PROCESSING PROGRAM, BE I/O PROCESSING PROGRAM, STORAGE DEVICE MANAGEMENT PROGRAM, NODE MANAGEMENT PROGRAM, TIER CONTROL PROGRAM, STORAGE AREA MANAGEMENT PROGRAM, VOLUME MANAGEMENT PROGRAM |
| 3 | LOWER | BE I/O PROCESSING PROGRAM, STORAGE DEVICE MANAGEMENT PROGRAM, NODE MANAGEMENT PROGRAM, STORAGE AREA MANAGEMENT PROGRAM, VOLUME MANAGEMENT PROGRAM |
| 4 | LOWER | BE I/O PROCESSING PROGRAM, STORAGE DEVICE MANAGEMENT PROGRAM, NODE MANAGEMENT PROGRAM, STORAGE AREA MANAGEMENT PROGRAM, VOLUME MANAGEMENT PROGRAM |

FIG. 1
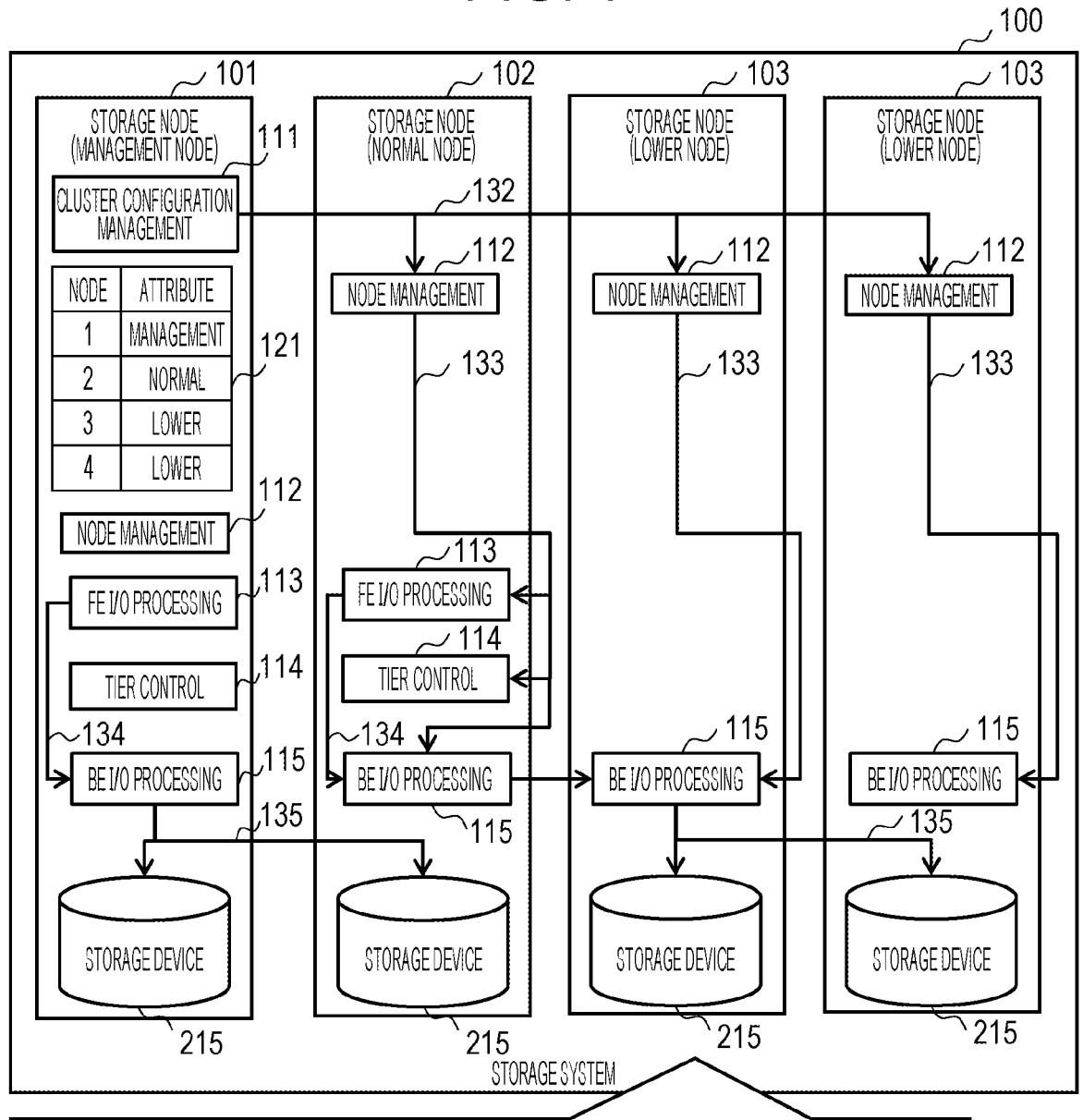
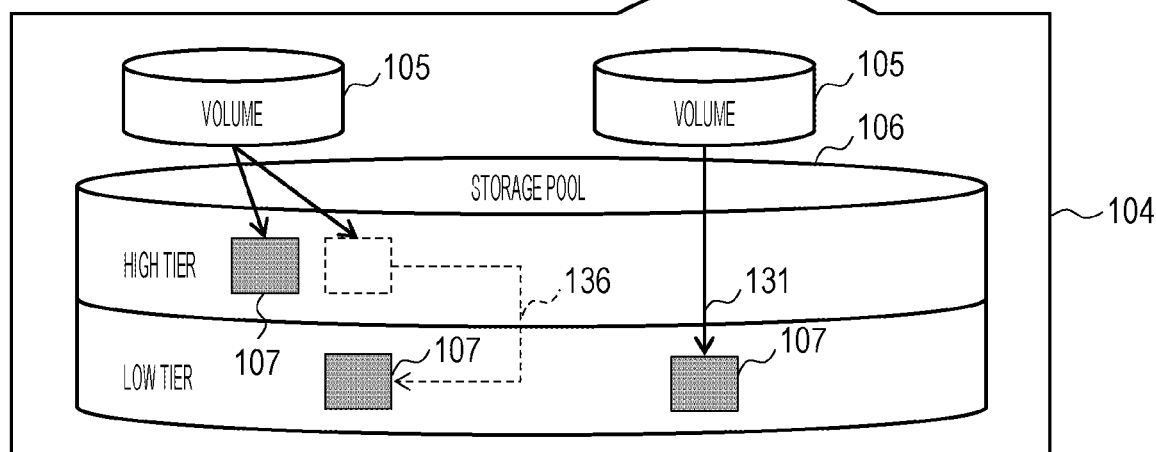

| NODE ID (1211) | ATTRIBUTE (1212) | STARTUP PROGRAM (1213) |
|---|---|---|
| 1 | MANAGEMENT | FE I/O PROCESSING PROGRAM, BE I/O PROCESSING PROGRAM, STORAGE DEVICE MANAGEMENT PROGRAM, NODE MANAGEMENT PROGRAM, CLUSTER CONFIGURATION MANAGEMENT PROGRAM, TIER CONTROL PROGRAM, STORAGE AREA CREATION/DELETION PROGRAM, STORAGE AREA MANAGEMENT PROGRAM, VOLUME MANAGEMENT PROGRAM, POOL MANAGEMENT PROGRAM |
| 2 | NORMAL | FE I/O PROCESSING PROGRAM, BE I/O PROCESSING PROGRAM, STORAGE DEVICE MANAGEMENT PROGRAM, NODE MANAGEMENT PROGRAM, TIER CONTROL PROGRAM, STORAGE AREA MANAGEMENT PROGRAM, VOLUME MANAGEMENT PROGRAM |
| 3 | LOWER | BE I/O PROCESSING PROGRAM, STORAGE DEVICE MANAGEMENT PROGRAM, NODE MANAGEMENT PROGRAM, STORAGE AREA MANAGEMENT PROGRAM, VOLUME MANAGEMENT PROGRAM |
| 4 | LOWER | BE I/O PROCESSING PROGRAM, STORAGE DEVICE MANAGEMENT PROGRAM, NODE MANAGEMENT PROGRAM, STORAGE AREA MANAGEMENT PROGRAM, VOLUME MANAGEMENT PROGRAM |

FIG. 7

| POOL ID | BELONGING VOLUME ID | HIGH-TIER USED CAPACITY | HIGH-TIER UNUSED CAPACITY | LOW-TIER USED CAPACITY | LOW-TIER UNUSED CAPACITY |
|---|---|---|---|---|---|
| 1 | 1, 2 | 3072 (Block) | 1024 (Block) | 0 (Block) | 4096 (Block) |

| VOLUME ID 1231 | ADDRESS 1232 | STORAGE AREA ID 1233 | TIER 1234 | I/O COUNTER 1235 |
|---|---|---|---|---|
| 1 | 0 TO 1023 (Block) | 1 | HIGH | 100 |
| 1 | 1024 TO 2047 (Block) | 2 | HIGH | 50 |
| 2 | 0 TO 1023 (Block) | 3 | LOW | 10 |

| STORAGE AREA ID 1241 | TIER 1242 | PRIMARY NODE ID 1243 | PRIMARY DRIVE ID 1244 | PRIMARY ADDRESS 1245 | SECONDARY NODE ID 1246 | SECONDARY DRIVE ID 1247 | SECONDARY ADDRESS 1248 |
|---|---|---|---|---|---|---|---|
| 1 | HIGH | 1 | 1 | 0 TO 1023 | 2 | 1 | 0 TO 1023 |
| 2 | HIGH | 1 | 1 | 1024 TO 2047 | 2 | 1 | 1024 TO 2047 |
| 3 | LOW | 3 | 1 | 0 TO 1023 | 4 | 1 | 0 TO 1023 |

| | 1251 | 1252 | 1253 | 1254 |
|---|---|---|---|---|
| | NODE ID | DRIVE ID | ADDRESS | STATE |
| | 1 | 1 | 0 TO 1023 | IN USE |
| | 1 | 1 | 1024 TO 2047 | IN USE |
| | 2 | 1 | 0 TO 1023 | IN USE |
| | 2 | 1 | 1024 TO 2047 | IN USE |
| | 3 | 1 | 0 TO 1023 | IN USE |
| | 3 | 1 | 1024 TO 2047 | UNUSED |
| | 4 | 1 | 0 TO 1023 | IN USE |
| | 4 | 1 | 1024 TO 2047 | UNUSED |

FIG. 22

| NODE ID | ATTRIBUTE | STARTUP PROGRAM |
|---|---|---|
| 1 | MANAGEMENT | SNAPSHOT MANAGEMENT PROGRAM, FE I/O PROCESSING PROGRAM, BE I/O PROCESSING PROGRAM, STORAGE DEVICE MANAGEMENT PROGRAM, NODE MANAGEMENT PROGRAM, CLUSTER CONFIGURATION MANAGEMENT PROGRAM, TIER CONTROL PROGRAM, STORAGE AREA CREATION/DELETION PROGRAM, STORAGE AREA MANAGEMENT PROGRAM, VOLUME MANAGEMENT PROGRAM, POOL MANAGEMENT PROGRAM |
| 2 | NORMAL | FE I/O PROCESSING PROGRAM, BE I/O PROCESSING PROGRAM, STORAGE DEVICE MANAGEMENT PROGRAM, NODE MANAGEMENT PROGRAM, TIER CONTROL PROGRAM, STORAGE AREA MANAGEMENT PROGRAM, VOLUME MANAGEMENT PROGRAM |
| 3 | LOWER | BE I/O PROCESSING PROGRAM, STORAGE DEVICE MANAGEMENT PROGRAM, NODE MANAGEMENT PROGRAM, STORAGE AREA MANAGEMENT PROGRAM, VOLUME MANAGEMENT PROGRAM |
| 4 | LOWER | BE I/O PROCESSING PROGRAM, STORAGE DEVICE MANAGEMENT PROGRAM, NODE MANAGEMENT PROGRAM, STORAGE AREA MANAGEMENT PROGRAM, VOLUME MANAGEMENT PROGRAM |

STORAGE SYSTEM AND NODE MANAGEMENT METHOD

BACKGROUND OF THE INVENTION

1. Field of the Invention

The present invention relates to a storage system and a node management method, and is suitably applied to a storage system forming a storage cluster using a plurality of storage apparatuses (storage nodes) and a node management method thereof.

2. Description of the Related Art

Conventionally, there has been known a storage system technique in which a plurality of storage apparatuses (storage nodes) are introduced as data storage areas and handled as one storage apparatus (storage cluster). For example, JP 2012-043407 A discloses a system in which a frontend storage apparatus controls a data arrangement tier based on a configuration of a backend storage apparatus. In addition, a use of operating only a storage that receive an instruction from the other and performs I/O processing without starting a computer that serves as a host and instructs the I/O processing on a node when the node is specified by a user at the time of adding the node to a storage cluster is generally performed.

SUMMARY OF THE INVENTION

However, in the case of the above-described related art, all processes provided in a storage control program are started at the time of adding the node to the storage cluster, and thus, there is a problem that the consumed amount of CPU and memory increases.

The invention has been made in consideration of the above-described points, and aims to propose a storage system and a node management method capable of reducing the amount of CPU and memory required for a node to be added by enabling selection of a program to be started on the node based on an attribute of the node specified by a user at the time of adding a node to a storage cluster.

In order to solve such a problem, the invention provides the following storage system in which a storage cluster is configured using a plurality of nodes. This storage system includes a storage device that stores data, a memory, and a processor that runs a program configured to perform I/O processing on the storage device. Further, attributes of the nodes are specified as first attribute nodes and second attribute nodes, and the I/O processing in the nodes is executed as a plurality of processes including front-end I/O processing executed by any of the first attribute nodes and back-end I/O processing executed by the first and second attribute nodes having the storage device that stores data relating to the I/O processing.

In addition, in order to solve such a problem, the invention provides the following node management method performed by a storage system that configures a storage cluster using a plurality of nodes. In this node management method, the storage system includes: a storage device that stores data; a memory; and a processor that runs a program configured to perform I/O processing on the storage device. Attributes of the nodes are specified as first attribute nodes and second attribute nodes. The I/O processing in the nodes is executed as a plurality of processes including front-end I/O processing executed by any of the first attribute nodes and back-end I/O processing executed by the first and second attribute nodes having the storage device that stores data relating to the I/O processing.

According to the invention, when the node is added to the storage cluster, it is possible to reduce the amount of CPU and memory required for the node to be added.

BRIEF DESCRIPTION OF THE DRAWINGS

FIG. 1 is a diagram illustrating a configuration example of a storage system according to a first embodiment of the invention;

FIG. 6 is a view illustrating a configuration example of a cluster configuration management table;

FIG. 7 is a view illustrating a configuration example of a pool management table;

FIG. 8 is a view illustrating a configuration example of a volume management table;

FIG. 9 is a view illustrating a configuration example of a storage area management table;

FIG. 10 is a view illustrating a configuration example of a storage device management table;

FIG. 22 is a view illustrating a configuration example of a cluster configuration management table illustrated in FIG. 21.

DESCRIPTION OF THE PREFERRED EMBODIMENTS

Figure 2:
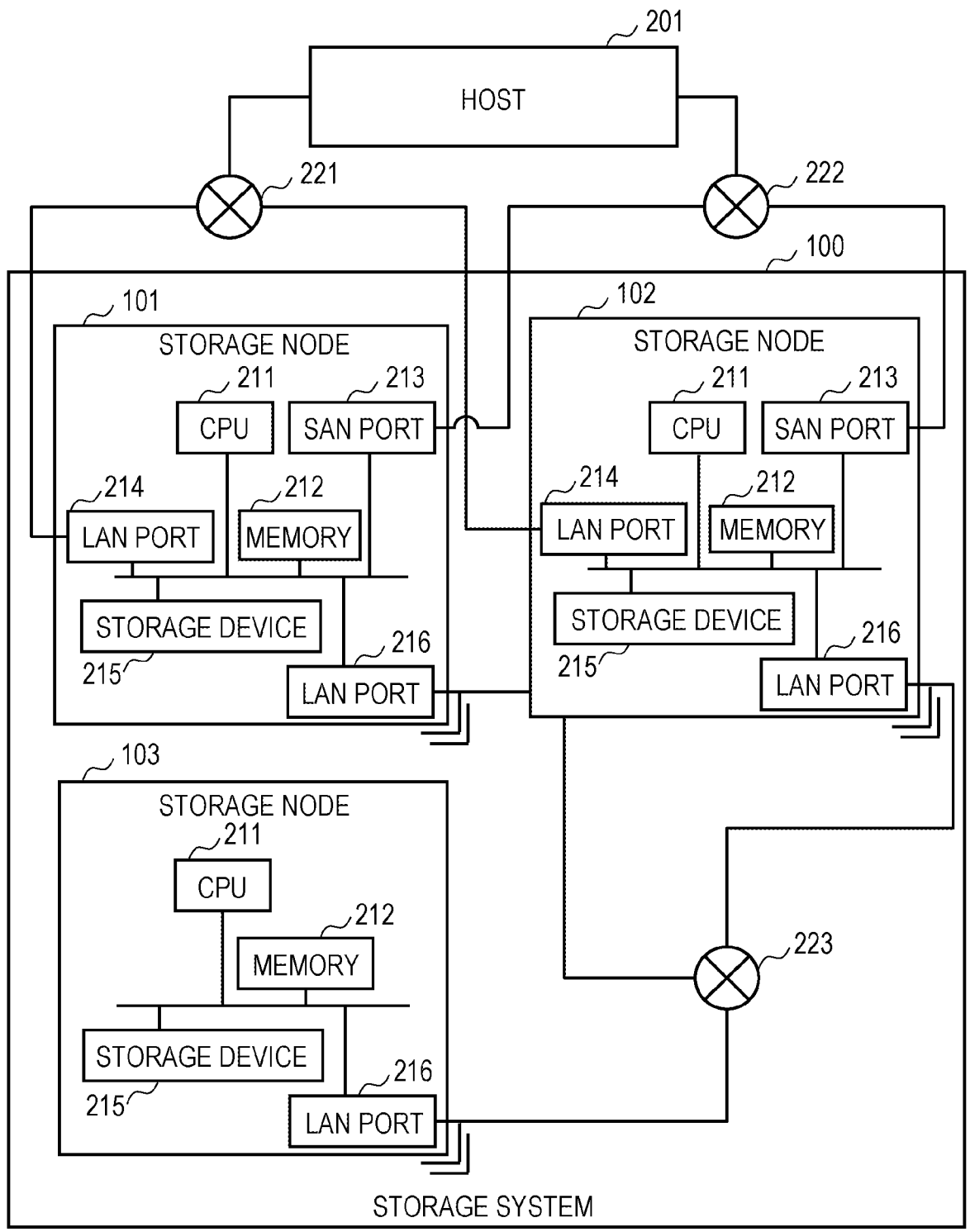
FIG. 2 is a diagram illustrating a hardware configuration example of the storage system illustrated in FIG. 1.

In the following description, an "interface unit" may be one or more interfaces. The one or more interfaces may be one or more homogeneous communication interface devices (for example, one or more network interface cards (NICs)), or may be two or more heterogeneous communication interface devices (for example, NIC and a host bus adapter (HBA)).

In the following description, a "memory unit" represents one or more memories, and may typically be a main storage device. At least one memory in the memory unit may be a volatile memory or a nonvolatile memory.

In the following description, a "storage device unit" is one or more storage devices, and may typically be an auxiliary storage device. The "storage device" means a physical storage device, and is typically a nonvolatile storage device, for example, a hard disk drive (HDD) or a solid state drive (SSD).

In the following description, a "storage unit" represents at least one (typically, at least the memory unit) of the memory unit and the storage device unit.

In the following description, a "processor unit" represents one or more processors. The at least one processor is typically a microprocessor such as a central processing unit (CPU), but may be another type of processor such as a graphics processing unit (GPU). The at least one processor may be a single-core or multi-core processor. The at least one processor may be a processor in a broad sense such as a hardware circuit that performs some or all of processes (for example, a field-programmable gate array (FPGA) or an application specific integrated circuit (ASIC)).

In addition, information will be sometimes described with an expression such as "xxx table" in the following description, but the information may be expressed with any data structure. That is, the "xxx table" can be referred to as "xxx information" in order to indicate that the information is not dependent on the data structure. In addition, in the following description, a configuration of each table is an example, one table may be divided into two or more tables, or all or some of two or more tables may be one table.

In addition, there is a case where processing is described with a "program" as a subject in the following description, but the subject of the processing may be a processor unit (or a device such as a controller having the processor unit) since the program is executed by the processor unit to perform the prescribed processing appropriately using a memory unit and/or an interface unit. The program may be installed on a device such as a computer from a program source. The program source may be a recording medium (for example, a non-transitory recording medium) readable by, for example, a program distribution server or a computer. In addition, in the following description, two or more programs may be realized as one program, or one program may be realized as two or more programs.

In the following description, a "volume" is an abbreviation for a logical volume, and may be a logical storage device. The volume may be a substantial volume (real volume) or a virtual volume (virtual volume). The "real volume" may be a volume based on physical storage resources (for example, one or more RAID groups) of a storage system that provides the real volume. The "virtual volume" may be any of a capacity expansion volume and a snapshot volume. The capacity expansion volume may be a volume that is constituted by a plurality of virtual areas (virtual storage areas) and conforms to a capacity virtualization technique (typically, thin provisioning). The snapshot volume may be a volume provided as a snapshot of an original volume. The snapshot may be a real volume. Typically, the snapshot volume is positioned on a secondary volume with the original volume as a primary volume. A "storage pool (also simply referred to as a pool)" is a logical storage area (for example, a set of a plurality of pool volumes), and may be prepared for each application. For example, the pool may include at least one type of a capacity expansion pool and a snapshot pool. The snapshot pool may be a storage area in which data evacuated from the primary volume is stored. One pool may be used as both the capacity expansion pool and the snapshot pool. A "pool volume" may be a volume that is a component of a pool. The pool volume may be a real volume.

In the following description, a "host system" is one or more physical or virtual host computers.

In the following description, a "storage cluster (also simply referred to as a cluster)" corresponds to one storage apparatus recognized by the host system, and the entity corresponds to the storage system. The "storage system" includes one or more physical storage apparatuses. The "storage apparatus" may be any apparatus having the storage unit, and may be a general-purpose computer. At least one physical storage apparatus may execute a virtual computer (for example, a virtual machine (VM)) or may execute software-defined anything (SDx). For example, a software defined storage (SDS) (an example of a virtual storage apparatus) or a software-defined data center (SDDC) can be adopted as the SDx. For example, a virtual computer serving as the host system and a virtual computer serving as a storage apparatus (storage controller) that receives and processes input/output (I/O) requests from the host system may be executed in the same storage apparatus. In addition, the storage system may have a redundant configuration group. Examples of the redundant configuration may include a configuration using a plurality of nodes, such as erasure coding, redundant array of independent nodes (RAIN), and mirroring between nodes, and a configuration within a single node such as one or more groups of redundant array of independent (or inexpensive) disks (RAID) configured using the storage device unit.

Hereinafter, embodiments of the invention will be described based on the drawings. Incidentally, the invention is not limited to the embodiments to be described hereinafter.

(1) First Embodiment (1-1) Configuration and Overview

FIG. 1 is a diagram illustrating a configuration example of a storage system according to a first embodiment of the invention. A storage system 100 according to the first embodiment is a storage system including one or more management nodes 101 and one or more normal nodes 102 and/or lower nodes 103, and may be, for example, a distributed storage system such as a scale-out storage system. All of the management node 101, the normal node 102, and the lower node 103 are storage nodes (also simply referred to as nodes) each having a storage device 215, and are classified by a role (attribute) in the storage system 100. In the following description, it is assumed that the storage system 100 includes the single management node 101 and one or more normal nodes 102 or lower nodes 103 as illustrated in FIG. 1.

In the storage system 100 according to the present embodiment, a computer program can cause a computer to execute the following processes A, B, and C. The "computer" referred to herein may be any of the management nodes 101 or a computer (for example, a management computer or a host computer) connected to the storage system 100. For example, the "computer" may be any of the management nodes 101, and a computer program that executes the process A may be a cluster configuration management program 111.

[Process A] When a storage node (node) is added to a storage cluster (cluster) in the storage system 100, which is a storage cluster recognized as "one storage apparatus" with respect to a host system (hereinafter, a host), a program to be started by the node is switched based on attribute information of the node specified by a user. The attribute specified for the node can be at least classified into upper and lower levels. In the present embodiment, "upper" is further classified into "management" and "normal".

[Process B] When a write instruction during input/output (I/O) is received from the host, data is stored in accordance with the write instruction in a storage area of an upper tier (high tier) among storage areas which are redundant across nodes and whose tiers are determined according to the attribute of the node.

[Process C] An I/O count with respect to the storage area within a fixed time is confirmed, and a storage area that does not satisfy an I/O eligibility condition defined for each tier is moved to a tier that satisfies the eligibility condition.

In the storage system 100 according to the present embodiment, the number of programs to be started is smaller than that of a node (for example, the normal node 102) having an upper attribute in a node (the lower node 103) for which a lower attribute is specified by the user since the above-described process A is executed. Thus, it is possible to reduce the amount of CPU and memory required for the node (the lower node 103).

In addition, in the storage system 100 according to the present embodiment, data in an area of the cluster that requires a small amount of input/output is stored in a storage area configured of a physical area (the storage device 215) provided in the node (the lower node 103) for which lower attribute has been specified even if a throughput, which is the amount of input/output that can be processed per fixed time, is low since the above-described processes B and C are executed. Thus, data can be stored in the entire cluster without lowering the throughput required by the host.

In addition, in the storage system 100 according to the present embodiment, it is possible to reduce the amount of CPU and memory required for the node while suppressing a decrease of the throughput by specifying a lower attribute for a node to be added to increase the capacity when a large capacity is required for the cluster since the above-described processes A, B, and C are executed. Thus, a physical disk (such as an HDD) which is relatively inexpensive although having a low throughput can be used for an additional node.

The description of the storage system 100 will be continued with reference to FIG. 1.

The management node 101 is a node responsible for management in the storage system 100, and provides a view 104 to a host 201 (see FIG. 2). As illustrated in FIG. 1, a volume 105 provided to the host 201 and a storage pool (pool) 106, which is a storage area to which the volume 105 belongs and provides information on an actually used capacity and an allocatable capacity are displayed on the view 104. I/O with respect to the volume 105 is actually performed with respect to the storage area 107 which is a partial area in the storage pool 106 (reference sign 131). This storage area 107 is made redundant over a plurality of nodes (storage devices 215) by a backend (BE) I/O processing program 115. As a result, a virtual volume is realized.

FIG. 1 illustrates some programs started in each of the nodes 101 to 103 of the storage system 100, and flows of processing are denoted by reference signs 132 to 136. In FIG. 1, the term "program" is omitted for convenience of space. The entire contents of the programs started in each of the nodes 101 to 103 will be described later with reference to FIGS. 3 to 5. In addition, a cluster configuration management table 121 in FIG. 1 illustrates only a part of the table, and the overall configuration thereof will be described later with reference to FIG. 6.

The above-described processes A, B, and C will be described as follows using the configuration of the storage system 100 illustrated in FIG. 1.

First, regarding the process A, when a node is added to the storage system 100, the node addition using a node attribute as an argument is instructed from a user (the host 201), and the cluster configuration management program 111 of the management node 101 receives this instruction. When receiving the node addition instruction, the cluster configuration management program 111 refers to the cluster configuration management table 121 and instructs a node management program 112 of each node to start a program according to the attribute (reference sign 132). Then, the node management program 112 that has received the instruction to start the program loads and starts programs, such as a frontend (FE) I/O processing program 113, a tier control program 114, and the backend (BE) I/O processing program 115 within the own node on a memory (reference sign 133).

Next, when the host 201 requests the storage system 100 to perform I/O processing regarding the process B, the processing is performed as follows. Only the management node 101 or the normal node 102 where the front-end I/O processing program 113 is present (started) receives I/O processing from the host 201. When I/O processing (a write instruction) to instruct storage of data to the volume 105 is requested from the host 201, the front-end I/O processing program 113 specifies an ID of the storage area 107 and instructs the back-end I/O processing program 115 to perform a data storage process (reference sign 134). Thereafter, the back-end I/O processing program 115 performs the data storage process on the plurality of storage devices 215 across nodes for data redundancy (reference sign 135).

Since the storage system 100 is configured to be capable of executing the processes A and B, the processing required for I/O processing can be divided into a plurality of processes (front-end I/O processing and back-end I/O processing) by functions, and the lower node 103 with the lower attribute can be prevented from executing the front-end I/O processing. Therefore, the number of programs to be started is small in the lower node 103 as compared with the management node 101 and the normal node 102, and further, the amount of data such as tables required at the time of executing the programs is also small, so that the necessary amount of CPU and memory can be reduced.

Next, the process C can be described as follows. In the storage system 100, the tier control program 114 provides a plurality of tiers for each of the storage areas 107 constituting the storage pool 106. In the present embodiment, as an example, a "high tier" and a "low tier" are provided as the plurality of tiers. In addition, an eligibility condition is set for each tier. Specifically, for example, "receiving 100 or more I/Os within a fixed time" is set as an eligibility condition for the high tier, and "receiving less than 100 I/Os within a fixed time" is set as an eligibility condition for the low tier. Then, the tier control program 114 periodically confirms whether or not the eligibility condition of the tier has been satisfied, and copies data allocated to the volume 105 to another tier for the storage area 107 that does not satisfy the eligibility condition (reference sign 136).

Since the storage system 100 is configured to be capable of executing the process C, for example, when a node having a low-functional storage device such as an HDD is defined as the lower node 103 and the storage area 107 created from the storage device 215 of the lower node 103 is placed in the "low tier", it is possible to suppress a decrease in performance as the storage system in the case of using a low-functional storage device.

Figure 19:
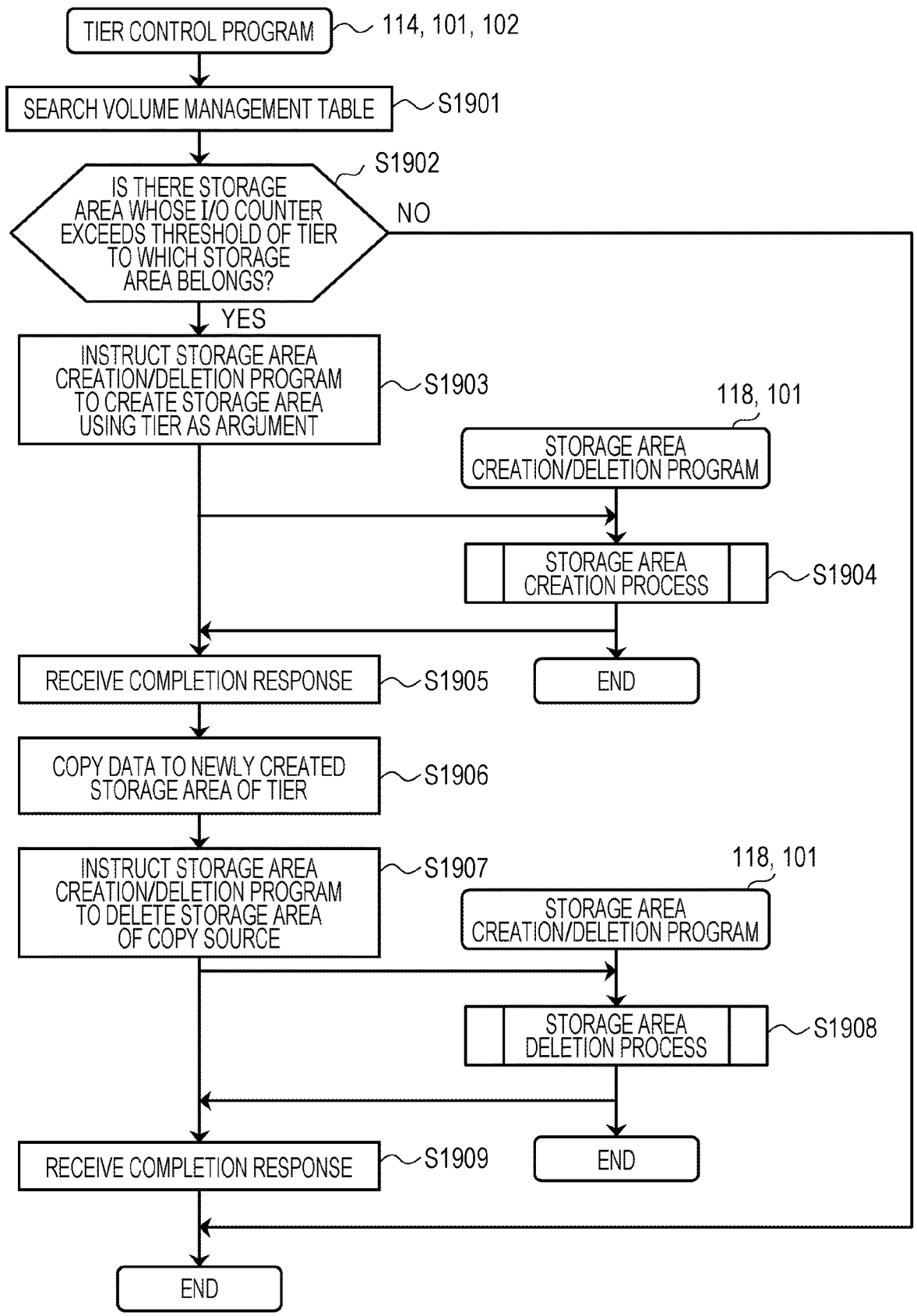
FIG. 19 is a view illustrating a processing procedure example of a tier control process.

Incidentally, the above-described process A corresponds to a node addition process (see FIG. 11), the process B corresponds to the I/O processing (see FIG. 14 and the like), and the process C corresponds to a tier control process (see FIG. 19 and the like).

FIG. 2 is a diagram illustrating a hardware configuration example of the storage system illustrated in FIG. 1. FIG. 2 illustrates the hardware configuration of the system including the host 201 connected to the storage system 100 via networks.

As illustrated in FIG. 2, the storage system 100 includes the plurality of nodes 101 to 103 connected to the networks, and is also connected to the host 201. FIG. 2 illustrates a local area network (LAN) 221, a storage area network (SAN) 222, and a LAN 223 as the networks to which the storage system 100 is connected. The LAN 221 and the SAN 222 are examples of a front-end network, and connect the host 201, the management node 101 of the storage system 100, and the normal node 102 of the storage system 100 to each other. The LAN 223 is an example of a back-end network, and connects the plurality of nodes (that is, the management node 101, the normal node 102, and the lower node 103) constituting the storage system 100 to each other. Although FIG. 2 illustrates only the single host 201, the single management node 101, the single normal node 102, and the single lower node 103, each of them may be configured in plural.

The host 201 is, for example, a server, and each of the one or more hosts 201 is connected to the front-end networks (the LAN 221 and the SAN 222). The host 201 receives an input operation from a user, requests an I/O to the storage system 100, and receives a response notification from the storage system 100. For example, the host 201 issues an I/O request that specifies an address belonging to the volume 105 to the storage system 100 via the front-end network. On the other hand, the storage system 100 performs I/O processing on the volume 105 based on the I/O request from the host 201.

Each of the nodes 101 to 103 of the storage system 100 has a memory 212, a SAN port 213, LAN ports 214 and 216, the storage device 215, and a CPU 211 connected thereto. The CPU 211 is an example of the processor unit, and the memory 212 is an example of the memory unit. The storage device 215 is an example of the storage device unit. The SAN port 213 and the LAN ports 214 and 216 are examples of the interface unit.

Incidentally, the lower node 103 does not include the SAN port 213 and the LAN port 214 in the case of FIG. 2. In the storage system 100 according to the present embodiment, the management node 101 and the normal node 102 execute the front-end I/O processing, and thus, require the SAN port 213 and the LAN port 214 which are interfaces for communication with host 201. However, the lower node 103 does not execute the front-end I/O processing, and thus, the SAN port 213 and the LAN port 214 are not necessarily required. In other words, it is sufficient for the lower node 103 to have at least the LAN port 216 that is an interface for communication with each of the nodes 101 to 103 in the storage system 100 in order to execute the back-end I/O processing.

(1-2) Program and Table

A computer program and a table used in the storage system 100 according to the present embodiment will be described in detail.

Figure 3:
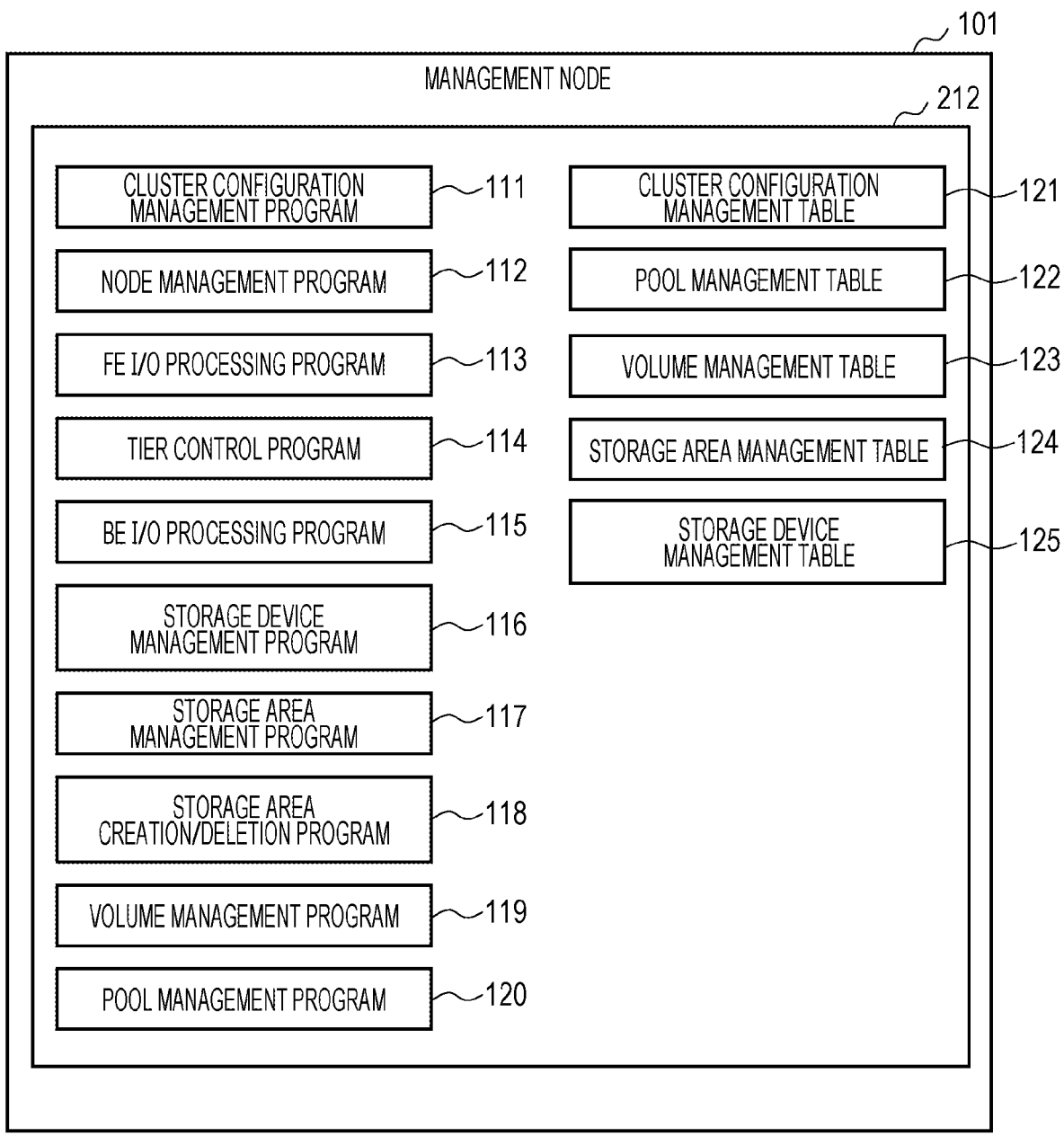
FIG. 3 is a diagram illustrating examples of a computer program executed by a management node.

FIG. 3 is a diagram illustrating examples of the computer program executed by the management node. The computer programs illustrated in FIG. 3 are stored in the memory 212 of the management node 101, and processes based on the respective computer programs are executed as the CPU 211 of the management node 101 reads and executes the respective computer programs. FIG. 3 also illustrates examples of the table held in the memory 212 of the management node 101. The CPU 211 of the management node 101 refers to or updates these tables when executing the above-described computer programs.

As illustrated in FIG. 3, the memory 212 of the management node 101 stores the cluster configuration management program 111, the node management program 112, the front-end (FE) I/O Processing program 113, the tier control program 114, the back-end (BE) I/O processing program 115, a storage device management program 116, a storage area management program 117, a storage area creation/deletion program 118, a volume management program 119, and a pool management program 120.

The cluster configuration management program 111 is a program that receives an instruction from a user or a program and issues a configuration change instruction to a program of any node in the cluster.

The node management program 112 is a program that loads and starts specified program and table on the memory 212.

The front-end I/O processing program 113 is a program that executes the front-end I/O processing including an interchange with the host 201 (user) in the I/O processing. The front-end I/O processing program 113 receives an I/O request for the volume 105 from the host 201, determines the storage area 107 which serves as a data storage destination, issues a storage instruction to the back-end I/O processing program 115, and returns a completion response to the host 201 upon completion.

The tier control program 114 is a program that performs control relating to the tiers of the storage area 107, and can move data to the storage area 107 of a tier that satisfies an eligibility condition when the data is stored in the storage area 107 of a tier that does not satisfy the eligibility condition.

The back-end I/O processing program 115 is a program that executes the back-end I/O processing for an interchange among the nodes in the I/O processing, and executes processing based on front-end input data and instruction. For example, when receiving the storage instruction from the front-end I/O processing program 113, the back-end I/O processing program 115 instructs a node having a data storage destination (the storage area 107) to transfer data and write data with respect to the storage device 215.

The storage device management program 116 is a program that processes an I/O request with respect to the storage device 215.

The storage area management program 117 is a program that updates the storage area management table 124 in a node based on a received instruction.

The storage area creation/deletion program 118 is a program that determines a correspondence between the storage area 107 and an address of the storage device 215, which is the entity of a storage designation, and instructs the storage area management program 117 of the relevant node to update the storage area management table 124.

The volume management program 119 is a program configured to create the volume 105.

The pool management program 120 is a program that collects information on the capacity in the cluster and displays the information to the user.

In addition, the memory 212 of the management node 101 stores the cluster configuration management table 121, a pool management table 122, a volume management table 123, a storage area management table 124, and a storage device management table 125 as illustrated in FIG. 3. In the management node 101, the storage device management table 125 holds information on all the storage devices 215 existing in the cluster, the volume management table 123 holds information on all the volumes 105 existing in the cluster, and the storage area management table 124 holds information on all the storage areas 107 existing in the cluster. In addition, the pool management table 122 holds information indicating a relationship between the corresponding volume 105 and its capacity information (a used capacity and an unused capacity) for all the pools 106 in the cluster. The information held by the pool management table 122 is displayed to the user. Configuration examples of the respective tables will be described later with reference to FIGS. 6 to 10.

Figure 4:
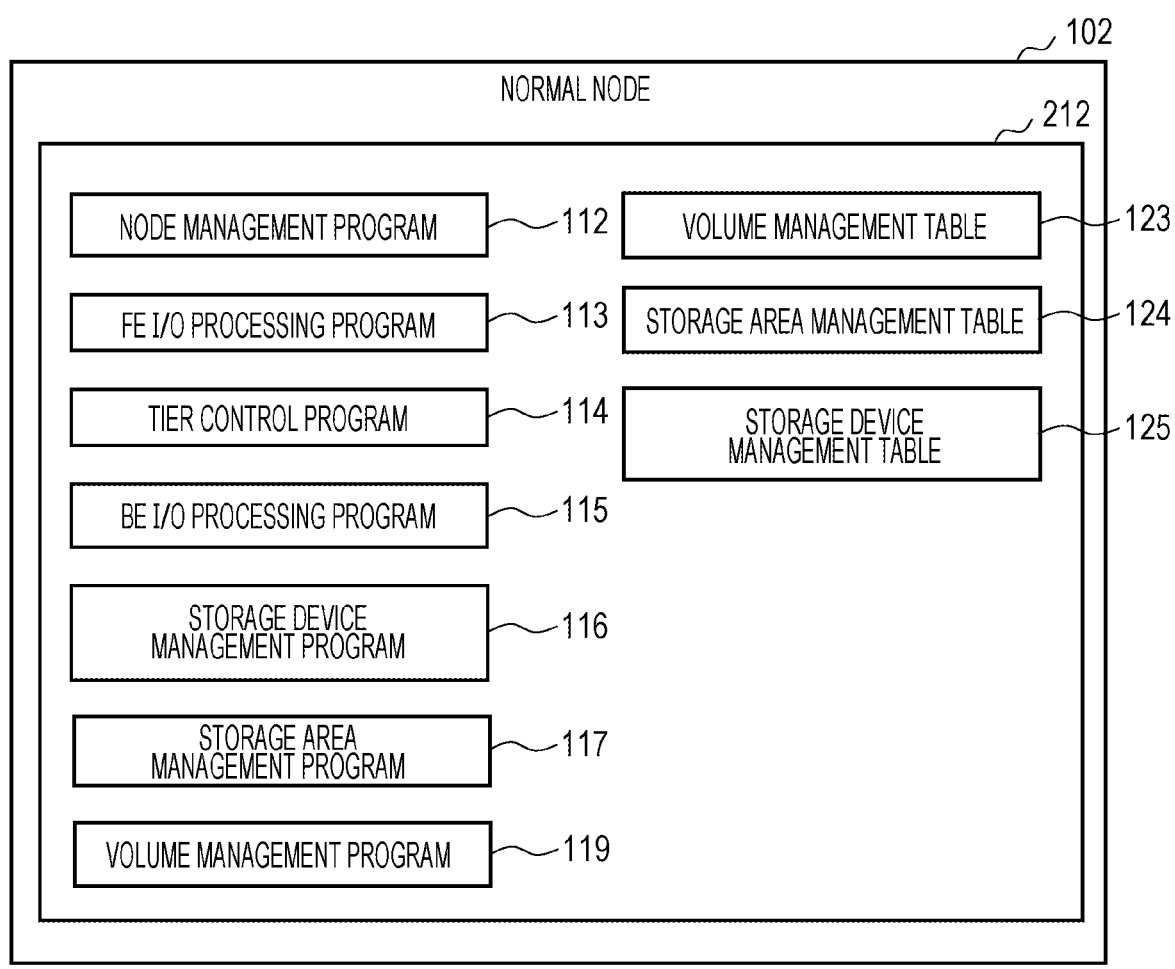
FIG. 4 is a diagram illustrating examples of a computer program executed by a normal node.

FIG. 4 is a diagram illustrating examples of the computer program executed by the normal node. The computer program illustrated in FIG. 4 is stored in the memory 212 of the normal node 102, and processes based on the respective computer programs are executed as the CPU 211 of the normal node 102 reads and executes the respective computer programs. FIG. 4 also illustrates examples of the table held in the memory 212 of the normal node 102. The CPU 211 of the normal node 102 refers to or updates these tables when executing the above-described computer programs.

As illustrated in FIG. 4, the memory 212 of the normal node 102 stores the node management program 112, the front-end (FE) I/O processing program 113, the tier control program 114, the back-end (BE) I/O processing program 115, the storage device management program 116, the storage area management program 117, and the volume management program 119. The descriptions of the respective programs are the same as those in FIG. 3, and thus will be omitted.

In addition, the memory 212 of the normal node 102 stores the volume management table 123, the storage area management table 124, and the storage device management table 125 as illustrated in FIG. 4. In the normal node 102, the volume management table 123 and the storage device management table 125 store information on only the volume 105 and the storage device 215 provided in the own node as a record. In addition, it is sufficient for the storage area management table 124 to hold information on the storage area 107 in which the storage device 215 provided in the own node is set as a storage destination, and information on the storage area 107 allocated to the volume 105 provided in the own node.

Figure 5:
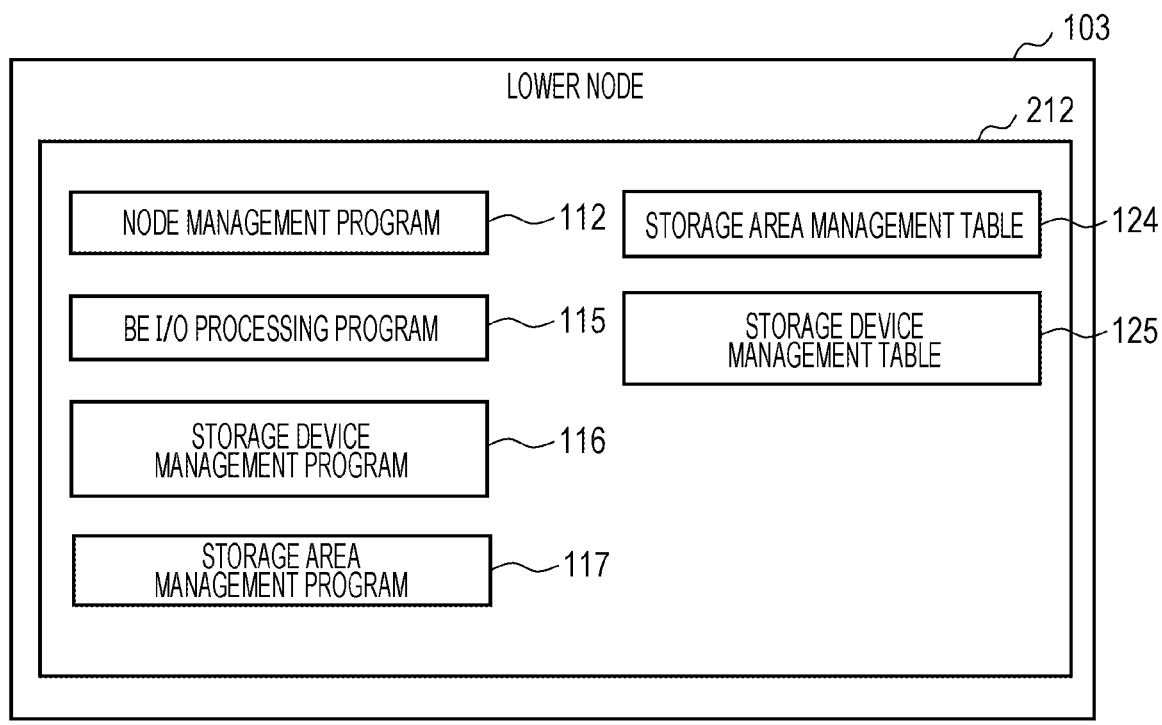
FIG. 5 is a diagram illustrating examples of a computer program executed by a lower node.

FIG. 5 is a diagram illustrating examples of the computer program executed by the lower node. The computer program illustrated in FIG. 5 is stored in the memory 212 of the lower node 103, and processes based on the respective computer programs are executed as the CPU 211 of the lower node 103 reads and executes the respective computer programs. FIG. 5 also illustrates examples of the table held in the memory 212 of the lower node 103. The CPU 211 of the lower node 103 refers to or updates these tables when executing the above-described computer programs.

As illustrated in FIG. 5, the memory 212 of the lower node 103 stores the node management program 112, the back-end (BE) I/O processing program 115, the storage device management program 116, and the storage area management program 117. The descriptions of the respective programs are the same as those in FIG. 3, and thus will be omitted.

In addition, the memory 212 of the lower node 103 stores the storage area management table 124 and the storage device management table 125 as illustrated in FIG. 5. In the lower node 103, it is preferable for the storage area management table 124 and the storage device management table 125 to hold, as a record, information on only the storage device 215 provided in the own node and the storage area 107 in which the storage device 215 is set as a storage destination.

FIG. 6 is a diagram illustrating a configuration example of the cluster configuration management table. The cluster configuration management table 121 is held in the management node 101 (see FIG. 3), and has a record for each node included in the storage system 100.

As illustrated in FIG. 6, each record of the cluster configuration management table 121 stores information such as a node ID 1211, an attribute 1212, and a startup program 1213.

The node ID 1211 indicates an identifier (ID) that can uniquely identify each of the nodes (the storage nodes 101 to 103) in the storage system 100. The attribute 1212 indicates an attribute associated with each of the nodes, and this attribute can be specified by a user when adding the node.

The cluster configuration management table 121 in FIG. 6 is an example based on the storage system 100 illustrated in FIG. 1. Specifically, the management node 101 has a node ID "1" and is associated with an attribute of "management", the normal node 102 has a node ID "2" and is associated with an attribute of "normal", and the two lower nodes 103 have nodes ID of "3" and "4", respectively, and is associated with an attribute of "lower". The startup program 1213 illustrates computer programs corresponding to FIG. 3 to FIG. 5 as details of the programs started in the respective nodes. Although the attribute of the management node 101 is set to "management" and the attribute of the normal node 102 is set to "normal" to distinguish between the two attributes in this example, the present embodiment is not limited thereto. For example, the attribute of the management node 101 and the attribute of the normal node 102 may be set to "upper" or the like without distinction.

Although only the programs are described in the startup program 1213 since a related table at the time of starting the programs is prepared in the memory 212 (see FIGS. 3 to 5) in the present embodiment, a table may be additionally described in the startup program 1213, for example, in a configuration in which the program and the table are separately loaded.

FIG. 7 is a view illustrating a configuration example of the pool management table. The pool management table 122 is held in the management node 101 (see FIG. 3), and has a record for each of the pools 106 included in the storage system 100.

As illustrated in FIG. 7, each record of the pool management table 122 stores information such as a pool ID 1221, a belonging volume ID 1222, a high-tier used capacity 1223, a high-tier unused capacity 1224, a low-tier used capacity 1225, and a low-tier unused capacity 1226.

The pool ID 1221 indicates an identifier (ID) that can uniquely identify the pool 106 in the storage system 100. The belonging volume ID 1222 indicates a list of IDs of the volumes 105 belonging to the pool 106 of the relevant record. The high-tier used capacity 1223 indicates a capacity that has been actually used in the higher-tier pool among all the volumes 105 belonging to the pool 106 of the record. The high-tier unused capacity 1224 indicates a capacity of an unused area in the higher-tier pool among all the volumes 105 belonging to the pool 106 of the record. The low-tier used capacity 1225 indicates a capacity that has been actually used in the lower-tier pool among all the volumes 105 belonging to the pool 106 of the record. The low-tier unused capacity 1226 indicates a capacity of an unused area in the lower-tier pool among all the volumes 105 belonging to the pool 106 of the record.

The pool management table 122 in FIG. 7 is an example based on the storage system 100 illustrated in FIG. 1. Specifically, a configuration is illustrated in which one storage pool 106 exists in the storage system 100, two volumes 105 exist for the storage pool 106, and three storage areas 107 have been allocated. Although the capacity is expressed in units of blocks in the case of FIG. 7, the present embodiment is not limited thereto, and units other than the block, such as "Byte", may be used.

FIG. 8 is a view illustrating a configuration example of the volume management table. The volume management table 123 is held in the management node 101 and the normal node 102 (see FIGS. 3 and 4). The volume management table 123 in the management node 101 has a record for each of the storage areas 107 allocated to all the volumes 105 of the storage system 100. In addition, the volume management table 123 in the normal node 102 has a record for each of the storage areas 107 allocated to the volumes 105 created in the normal node 102. FIG. 8 illustrates, as an example, specific values of the volume management table 123 held in the management node 101 illustrated in FIG. 1.

As illustrated in FIG. 8, each record of the volume management table 123 stores information such as a volume ID 1231, an address 1232, a storage area ID 1233, a tier 1234, and an I/O counter 1235.

The volume ID 1231 indicates an identifier (ID) that can uniquely identify the volume 105 in the storage system 100, and the same ID as the belonging volume ID 1222 in FIG. 7 is used. The address 1232 indicates an address of the volume 105 of the record. The storage area ID 1233 indicates a unique storage area identifier (ID) in the storage system 100, the storage area allocated to the address 1232 of the volume 105 of the record. The tier 1234 indicates a tier to which the storage area indicated by the storage area ID 1233 of the record belongs. In this example, two types of tiers including a high tier and a low tier are prepared. The I/O counter 1235 indicates the number of I/Os which have been issued to the storage area indicated by the storage area ID 1233 of the record since execution of a previous tier control process (see FIG. 19 to be described later).

FIG. 8 illustrates the volume management table 123 held in the management node 101. The case of the volume management table 123 held in the normal node 102 or the lower node 103 may be handled in the same manner as that in the case of the management node 101, or the amount of data may be further reduced. In the case of reducing the amount of data of the volume management table 123 held in the normal node 102 or the lower node 103, it is sufficient if at least information on the own entry is held.

FIG. 9 is a view illustrating a configuration example of the storage area management table. The storage area management tables 124 are respectively held in the management node 101, the normal node 102, and the lower node 103 (see FIGS. 3 to 5). The storage area management table 124 in the management node 101 has a record for each of the storage areas 107 of the storage system 100. In addition, the storage area management tables 124 in the normal node 102 and the lower node 103 have a record for each of the storage areas 107 in which the storage device 215 of the own node is set as a storage destination. FIG. 9 illustrates, as an example, specific values of the storage area management table 124 held in the management node 101 illustrated in FIG. 1.

As illustrated in FIG. 9, each record of the storage area management table 124 stores information such as a storage area ID 1241, a tier 1242, a primary node ID 1243, a primary drive ID 1244, a primary address 1245, a secondary node ID 1246, a secondary drive ID 1247, and a secondary address 1248.

The storage area ID 1241 indicates an identifier (ID) that can uniquely identify the storage area 107 in the storage system 100, and the same ID as the storage area ID 1233 in FIG. 8 is used. The tier 1242 indicates a tier to which the storage area 107 of the record belongs, and the same value as the tier 1234 in FIG. 8 is used. The primary node ID 1243 indicates an ID of a "primary" node that has the authority of processing for the storage area 107 of the record and is handled as a normal system. The ID used for the primary node ID 1243 and the secondary node ID 1246 is the same as the ID used for the node ID 1211 in FIG. 6. The primary drive ID 1244 indicates an ID of the primary storage device 215 that is actually stored when an I/O is issued to the storage area 107 of the record. The primary address 1245 indicates a storage destination address on the primary side that is actually stored when an I/O is issued to the storage area 107 of the record. The secondary node ID 1246 indicates an ID of a "secondary" node whose processing is requested as a redundancy destination for the storage area 107 of the record. The secondary drive ID 1247 indicates an ID of the storage device 215 at the redundancy destination that is actually stored when an I/O is issued to the storage area 107 of the record. The secondary address 1248 indicates an address of the redundancy destination that is actually stored when an I/O is issued to the storage area 107 of the record.

FIG. 10 is a view illustrating a configuration example of the storage device management table. The storage device management tables 125 are respectively held in the management node 101, the normal node 102, and the lower node 103 (see FIGS. 3 to 5). The storage device management table 125 in the management node 101 has a record for each fixed area (having the same capacity as one storage area 107) of all the storage devices 215 provided in the storage system 100. In addition, the storage device management tables 125 in the normal node 102 and the lower node 103 have a record for each fixed area (having the same capacity as one storage area 107) of all the storage devices 215 provided in the own node. FIG. 10 illustrates, as an example, specific values of the storage device management table 125 held in the management node 101 illustrated in FIG. 1.

As illustrated in FIG. 10, each record of the storage device management table 125 stores information such as a node ID 1251, a drive ID 1252, an address 1253, and a state 1254.

The node ID 1251 indicates an identifier (ID) that can uniquely identify a node in the storage system 100, and the same ID as the node ID 1211 in FIG. 6 is used. The drive ID 1252 indicates a unique ID of the storage device 215 in the node indicated by the node ID 1251 of the record. Note that a unique ID within the storage system 100 may be allocated to the ID used for the drive ID 1252. The address 1253 indicates an address allocated into a fixed area (having the same capacity as one storage area 107) in the storage device 215 indicated by the drive ID 1252 of the record. The state 1254 indicates a use state (in use/unused) as the storage area 107 of s storage area indicated by the address 1253 of the record.

(1-3) Processing

Various processes executed by the storage system 100 according to the present embodiment will be described in detail.

Figure 11:
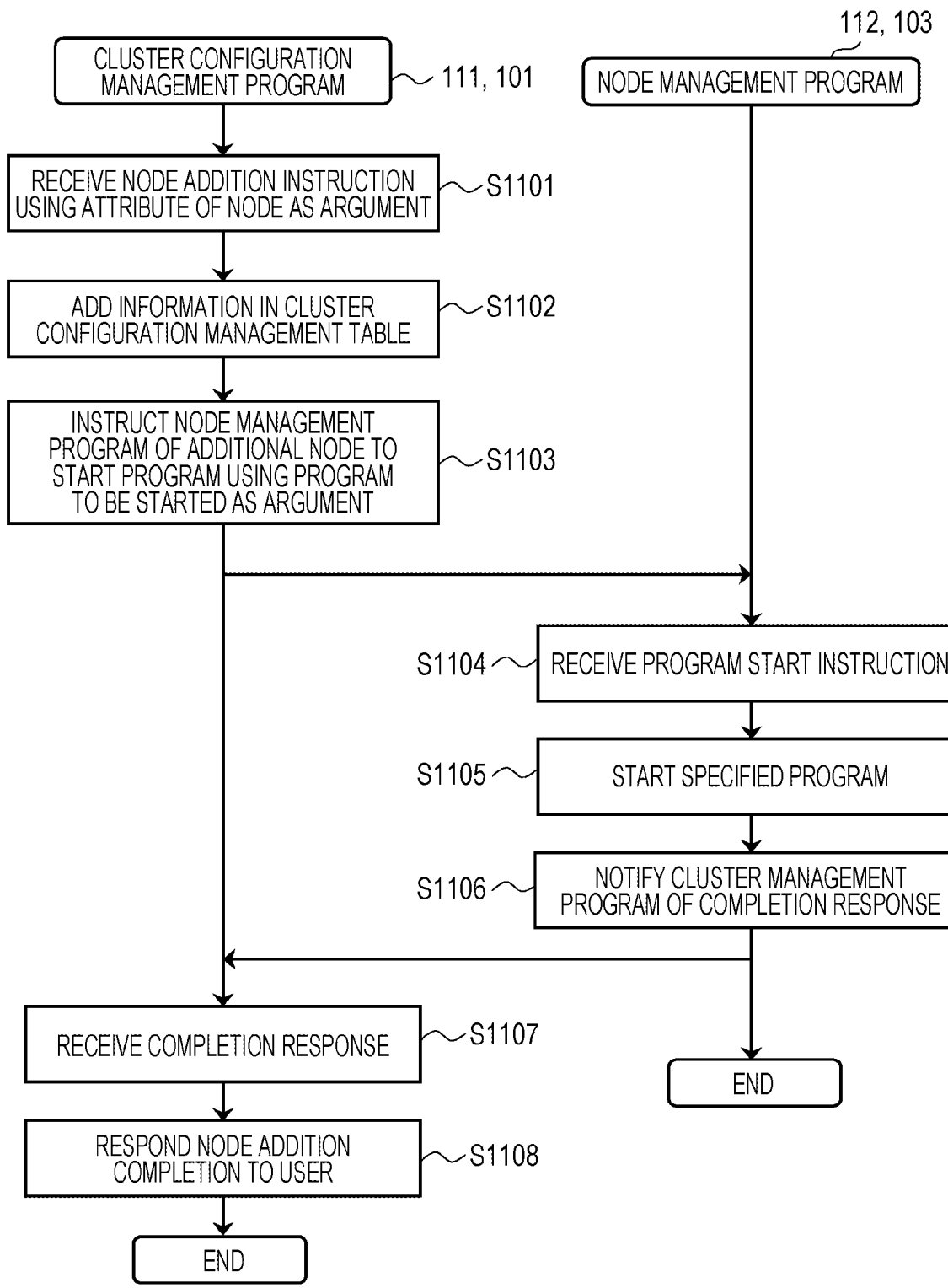
FIG. 11 is a view illustrating a processing procedure example of a node addition process.

FIG. 11 is a view illustrating a processing procedure example of the node addition process. The node addition process illustrated in FIG. 11 is a process executed at the time of adding a node to the storage system 100, and is started in response to a node addition instruction. The node addition instruction specifies a node to be added (additional node), and has an attribute of the node as an argument. The attribute of the node is specified by a user, for example.

According to FIG. 11, when receiving the node addition instruction with the attribute of the additional node as the argument (Step S1101), the cluster configuration management program 111 of the management node 101 first adds a new record relating to the additional node to the cluster configuration management table 121 stored in the own node (Step S1102). For example, when the attribute is specified as "lower" in the node addition instruction to add the node 103, the cluster configuration management program 111 adds the ID of the node 103 to the node ID 1211, adds "lower" to the attribute 1212, and adds information of the node management program 112 to the startup program 1213, in the new record of the cluster configuration management table 121 (see FIG. 6). At this time, a program (in this example, the node management program 112) whose information is added to the startup program 1213 is determined in advance in accordance with the attribute 1212.

Thereafter, the cluster configuration management program 111 of the management node 101 instructs the node management program 112 of the node added to the storage system 100 to start another program (Step S1103).

Here, in the additional node (for example, the lower node 103), only the node management program 112 configured to start another program in the node is present (started) as an initial state. In this state, when receiving a program start instruction from the cluster configuration management program 111 of the management node 101 in Step S1103 (Step S1104), the node management program 112 of the additional node starts another program specified as an argument (Step S1105).

In Step S1105, the node management program 112 of the additional node starts not all programs held by the own node (for example, the lower node 103 also holds a plurality of programs similarly to the normal node 102 in the memory 212) but only the program specified by the instruction in Step S1103, and secures an area of the memory 212 only for a table required by the program. Specifically, for example, in the lower node 103, the back-end I/O processing program 115, the storage device management program 116, and the storage area management program 117 are started, and the storage device management table 125 relating to the storage device management program 116 and the storage area management table 124 relating to the storage area management program 117 are loaded on the memory 212, through the processing of Step S1105. In the present embodiment, it is sufficient for the node which has been added with the "lower" attribute specified in this manner to have a smaller area of the memory 212 secured for a program to be started and a table relating to the program than the management node 101 or the normal node 102, and thus, the required amount of the CPU 211 and the memory 212 can be reduced as compared with the management node 101 and the normal node 102.

After the start and loading of the program in Step S1105 are completed, the node management program 112 of the additional node notifies the cluster configuration management program 111 of the management node 101 of a completion response (Step S1106).

Next, the cluster configuration management program 111 of the management node 101 receives a completion response of the program start instruction from the additional node (Step S1107). When receiving the completion response of the program start instruction, the cluster configuration management program 111 of the management node 101 determines that the necessary program is started in the additional node so that the additional node is in the state of being capable of executing the function corresponding to the specified attribute, responds to the user that the node addition has been completed (Step S1108), and ends the node addition process.

Figure 12:
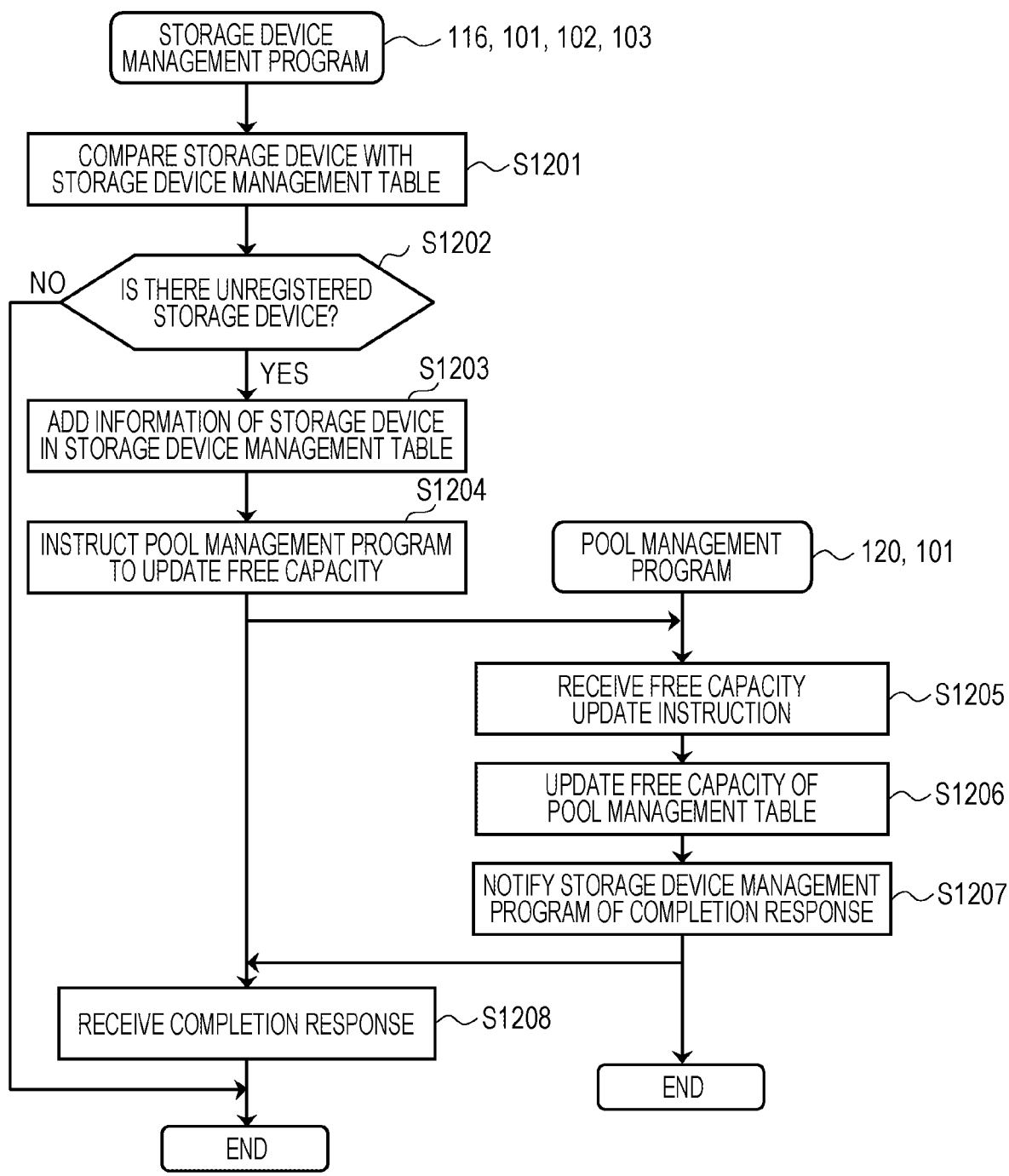
FIG. 12 is a view illustrating a processing procedure example of a storage device addition process.

FIG. 12 is a view illustrating a processing procedure example of a storage device addition process. The storage device addition process illustrated in FIG. 12 is a process of confirming whether there is any unregistered storage device 215 that has not been registered in the management table (the storage device management table 125) and taking predetermined action when there is an unregistered storage device 215, and is executed periodically (for example, every 10 seconds) in each node.

According to FIG. 12, first, in each node (for example, the lower node 103 having the fewest functions), the storage device management program 116 finds a storage device 215 in the own node, and compares information of the storage device 215 with information registered in the storage device management table 125 (Step S1201).

Next, the storage device management program 116 determines whether the storage device 215 compared in Step S1201 has not been registered in the storage device management table 125 (Step S1202), and proceeds to Step S1203 when the storage device 215 compared in Step S1201 is not registered in the storage device management table 125. On the other hand, when there is no unregistered storage device 215 in Step S1202 (NO in Step S1202), the storage device addition process is ended.

In Step S1203, the storage device management program 116 adds information of the unregistered storage device 215 to the storage device management table 125. Specifically, for the unregistered storage device 215, unique IDs corresponding to the node ID 1251 and the drive ID 1252 and addresses thereof are segmented at an interval of a certain area (having the same capacity as one storage area 107), and new records as many as the number of segmentations are created, the addresses 1253 of the respective records are registered, and the states 1254 of the respective records are registered as "unused".

Next, the storage device management program 116 uses the number of the new records added to the storage device management table 125 in Step S1203 as an argument to issue a free capacity update instruction to the pool management program 120 operating in the management node 101 (Step S1204).

When the pool management program 120 of the management node 101 receives the free capacity update instruction (Step S1205), the number of blocks is converted from the number of records received as the argument, and the pool management table 122 is updated by increasing the free capacity of the pool 106 (Step S1206). Thereafter, the pool management program 120 transmits a completion response to the storage device management program 116 that is a transmission source of the free capacity update instruction in Step S1204 (Step S1207).

Then, the storage device management program 116 receives the completion response with respect to the free capacity update instruction (Step S1208), and ends the storage device addition process.

Figure 13:
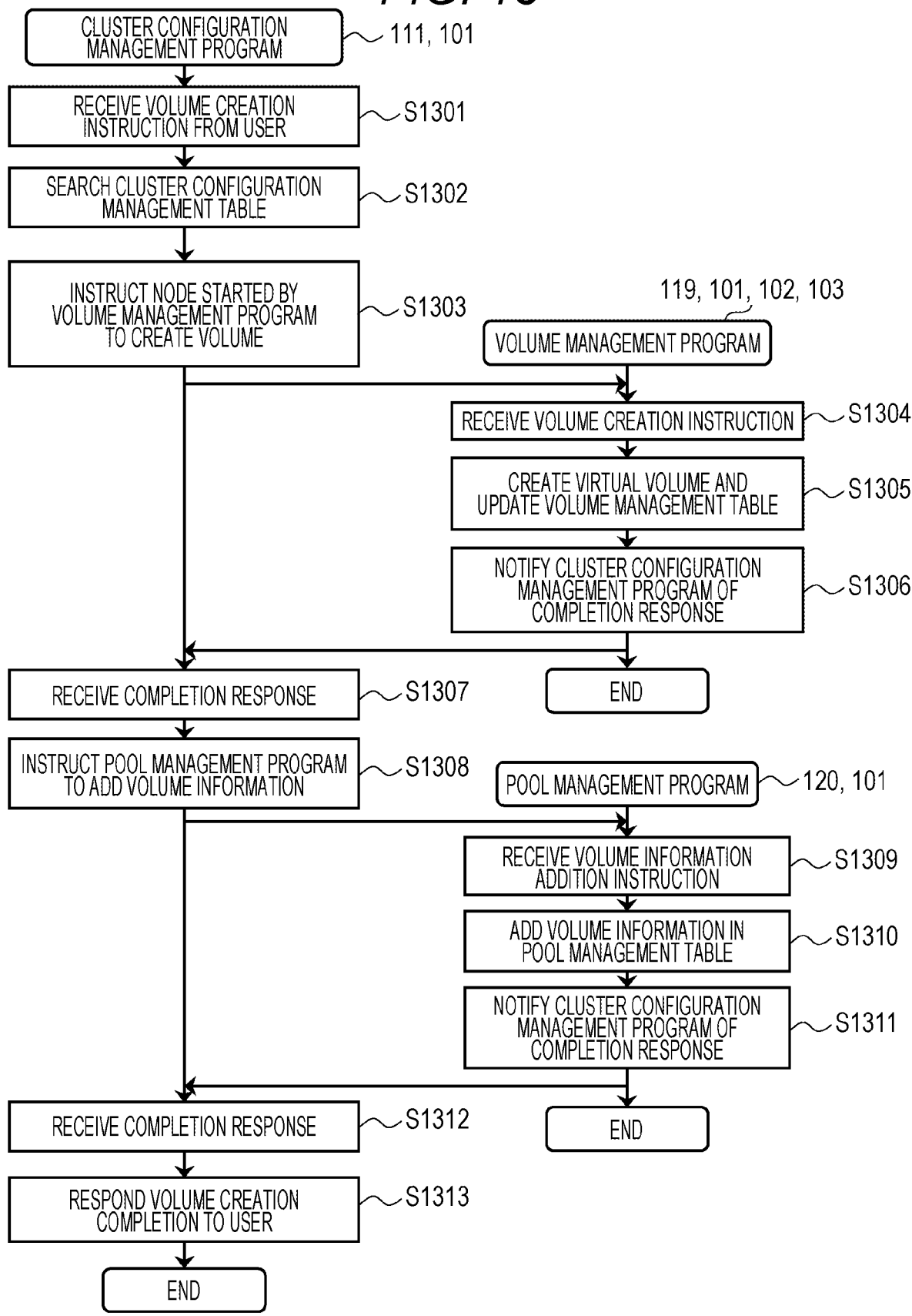
FIG. 13 is a view illustrating a processing procedure example of a volume creation process.

FIG. 13 is a view illustrating a processing procedure example of a volume creation process. The volume creation process illustrated in FIG. 13 is a process of creating a volume 105 in response to a volume creation instruction from a user.

According to FIG. 13, first, the cluster configuration management program 111 of the management node 101 receives a volume creation instruction to instruct creation of the volume 105 from the user (Step S1301). Next, the cluster configuration management program 111 searches the cluster configuration management table 121 (Step S1302) for nodes in which the volume management program 119 has been run by the startup program 1213, selects one of the nodes, and issues the volume creation instruction to the selected node (Step S1303).

Next, when the volume management program 119 receives the volume creation instruction issued in Step S1303 (Step S1304), the transmission destination node of the volume creation instruction creates a virtual volume (the volume 105), and updates the volume management table 123 (Step S1305). At the stage of Step S1305, the volume management program 119 registers only the volume ID 1231 in the volume management table 123, and allocates the storage area 107 (registers the address 1232, the storage area ID 1233, and the like) only when data is written to an address to which the storage area 107 has not been allocated during the subsequent I/O processing, thereby realizing thin provisioning. Thereafter, the volume management program 119 transmits a completion response to the cluster configuration management program 111 that is a transmission source of the volume creation instruction in Step S1303 (Step S1306).

Then, the cluster configuration management program 111 receives the completion response with respect to the volume creation instruction (Step S1307). Next, the cluster configuration management program 111 instructs the pool management program 120 of the own node (the management node 101) to add volume information using an ID of the created volume 105 (the volume ID 1231 registered in the volume management table 123 in Step S1305) as an argument (Step S1308).

When receiving a volume information addition instruction from the cluster configuration management program 111 in Step S1308 (Step S1309), the pool management program 120 adds the ID of the volume 105 delivered as the argument of the volume information addition instruction to the belonging volume ID 1222 of the pool management table 122 (Step S1310). Thereafter, the pool management program 120 transmits a completion response to the cluster configuration management program 111 that is a transmission source of the volume information addition instruction in Step S1308 (Step S1311).

When receiving the completion response with respect to the volume information addition instruction (Step S1312), the cluster configuration management program 111 determines that the creation of the volume 105 has been completed, and respond to the user that the volume creation has been completed (Step S1313), and ends the volume creation process.

Although one of the nodes in which the volume management program 119 is running is selected as the destination to which the volume creation instruction is issued in the above Step S1303, as a node selection criterion at this time, for example, a node having the least volume 105 that has been created may be selected from among the nodes in which the volume management program 119 is running.

Figure 14:
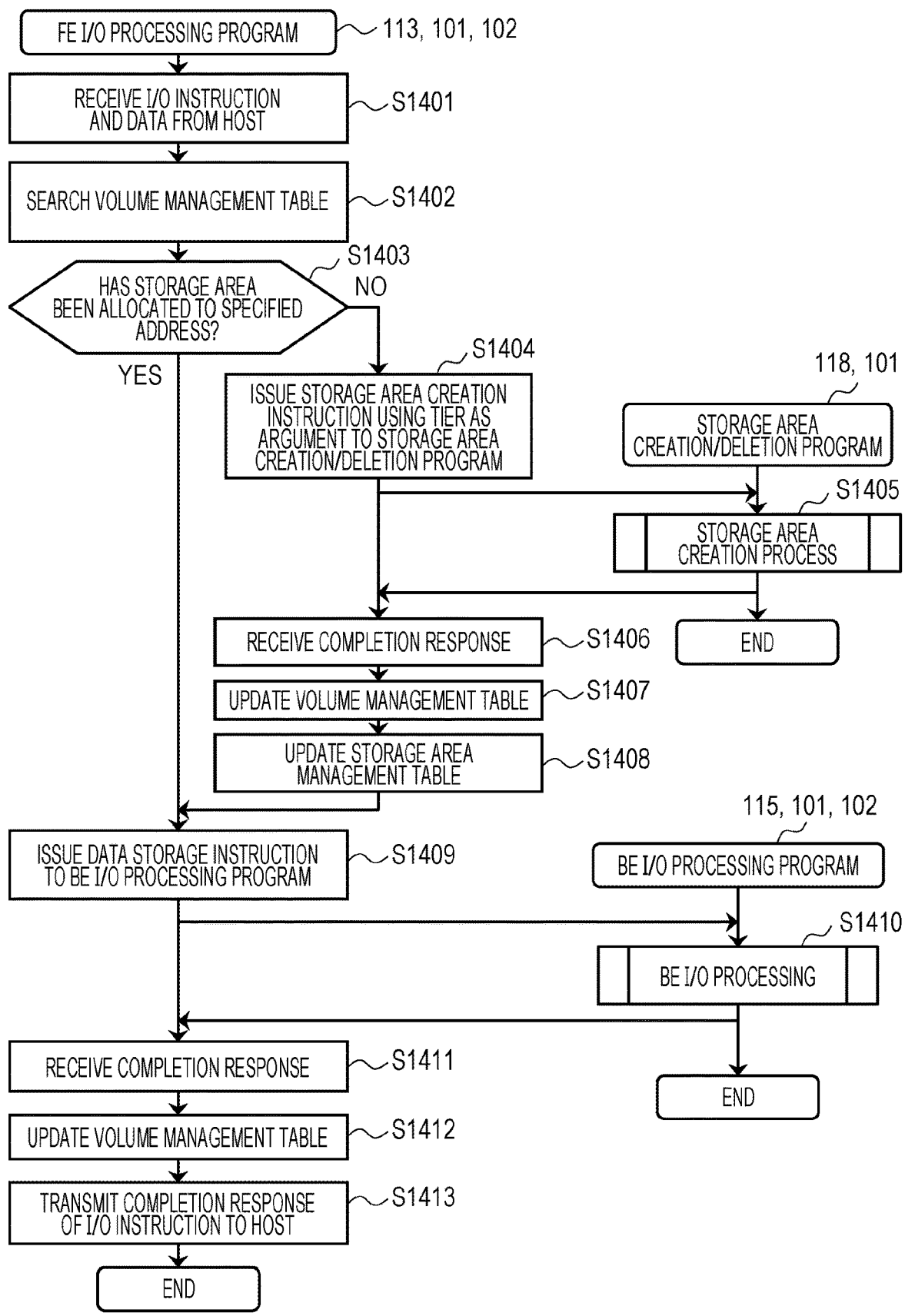
FIG. 14 is a view illustrating a processing procedure example of I/O processing.

FIG. 14 is a view illustrating a processing procedure example of I/O processing. The I/O processing illustrated in FIG. 14 is processing to input and output data. Hereinafter, a case of a write process indicating data storage will be described as an example.

According to FIG. 14, first, the front-end I/O processing program 113 receives an I/O instruction and data (a write instruction and write data in this example) issued through the front-end network (the LAN 221 or the SAN 222) by the host 201 (Step S1401). The node in which the front-end I/O processing program 113 is running is the management node 101 or the normal node 102.

Next, the front-end I/O processing program 113 refers to the volume management table 123 (Step S1402) to determine whether the storage area 107 has been allocated to an address of the volume 105 specified by the I/O instruction from the host 201 (Step S1403). If the storage area 107 has been allocated in Step S1403 (YES in Step S1403), the process proceeds to Step S1409 to be described below.

On the other hand, when the storage area 107 has not been allocated in Step S1403 (NO in Step S1403), the storage area 107 is not allocated to the address of the volume 105 specified by the I/O instruction (write instruction), and thus, the front-end I/O processing program 113 requires the storage area 107 to store the specified data (write data). In this case, the front-end I/O processing program 113 issues a storage area creation instruction to the storage area creation/deletion program 118 operating in the management node 101 using a tier as an argument (Step S1404). In this example, the storage area 107 to be allocated according to the write instruction from the host 201 is set from the high tier.

When the storage area creation instruction is issued in Step S1404, the storage area creation/deletion program 118 of the management node 101 receives the storage area creation instruction, executes a storage area creation process of creating the storage area 107, and notifies a completion response after the creation of the storage area 107 (Step S1405). Details of the storage area creation process will be described later with reference to FIG. 15.

Then, the front-end I/O processing program 113 receives the completion response from the storage area creation/deletion program 118 with the storage area ID 1241 and the primary node ID 1243 relating to the storage area 107 created in Step S1405 as return values (Step S1406).

Next, the front-end I/O processing program 113 adds information on the storage area ID 1233 and the tier 1234 to the volume management table 123 in the record corresponding to the storage area 107 created in Step S1405 (Step S1407). In addition, the front-end I/O processing program 113 adds information on the storage area ID 1241 and the primary node ID 1243 to the storage area management table 124 in the record corresponding to the storage area 107 created in Step S1405 (Step S1408). When the processing in Step S1408 is completed, the process proceeds to Step S1409.

In Step S1409, the front-end I/O processing program 113 issues a data storage instruction to the back-end I/O processing program 115 operating in the own node with an ID of the storage area 107 created in Step S1405 and the data (write data) received in Step S1401 as arguments. When the processing of Step S1409 is performed after YES in Step S1403, it is sufficient for the front-end I/O processing program 113 to use, as an argument, an ID of the storage area 107, which has been confirmed to be already allocated in Step S1403, instead of the ID of the storage area 107 created in Step S1405.

When the data storage instruction is issued in Step S1409, the back-end I/O processing program 115 of the own node receives the data storage instruction, executes the back-end (BE) I/O processing to store data in the storage area 107 based on the data storage instruction, and notifies a completion response (Step S1410). Details of the back-end I/O processing will be described later with reference to FIG. 18.

Then, the front-end I/O processing program 113 receives the completion response from the back-end I/O processing program 115 (Step S1411). Next, the front-end I/O processing program 113 updates the I/O counter 1235 in the volume management table 123 (Step S1412). Then, the front-end I/O processing program 113 determines that the I/O instruction received from the host 201 has been completed, returns the completion response to the host 201 (Step S1413), and ends the I/O processing.

Although the high tier is specified as the tier of the storage area 107 to store the write data (Step S1404) in the above description, the present embodiment is not limited thereto, and the low tier may be specified for the write data.

Although the creation of the storage area 107 is performed during the I/O processing (Step S1405) in the above description, the present embodiment is not limited thereto. For example, the storage area 107 may be created as an extension of the node addition process illustrated in FIG. 11. In this case, allocation may be performed, instead of the storage process, during the I/O processing.

Figure 15:
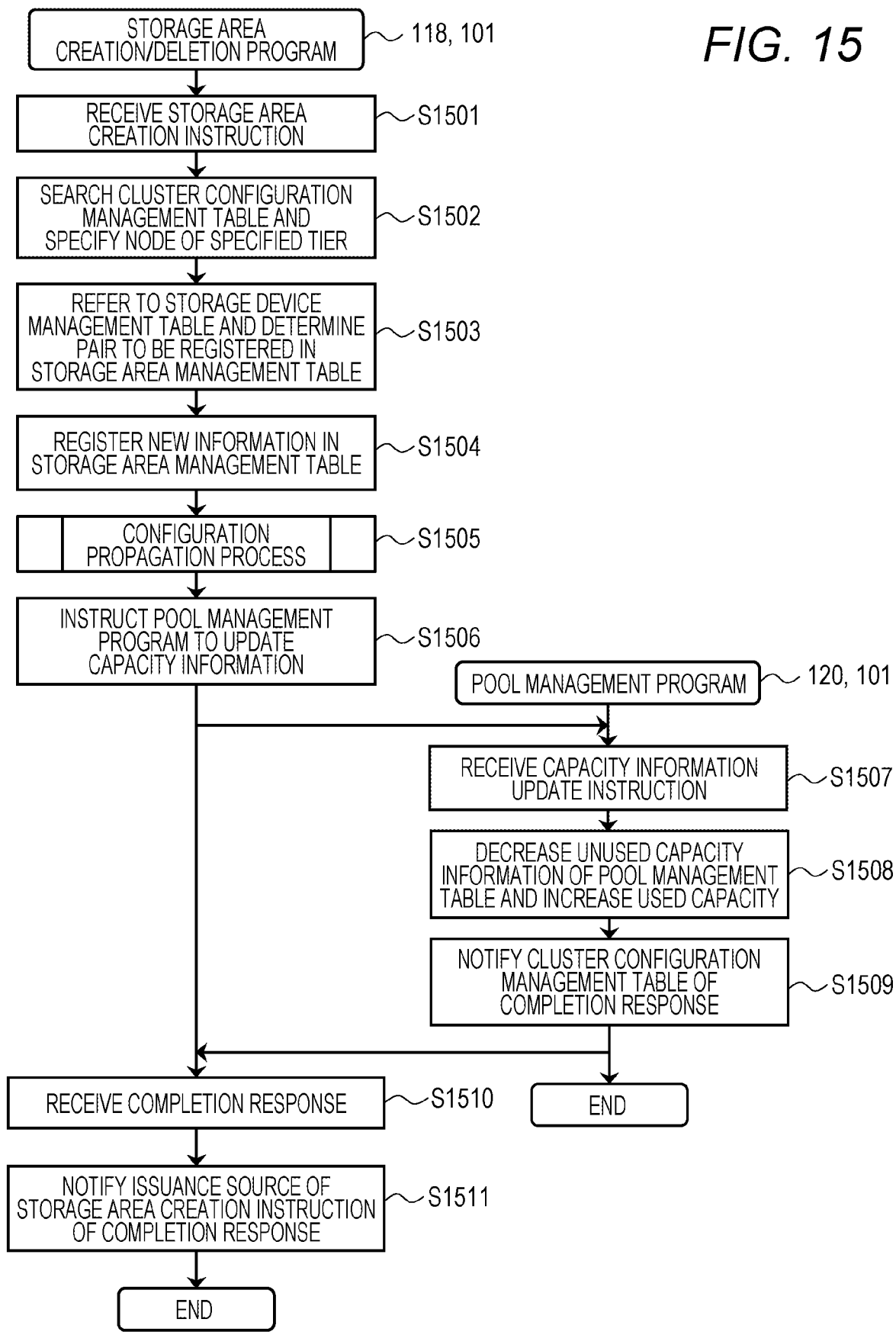
FIG. 15 is a view illustrating a processing procedure example of a storage area creation process.

FIG. 15 is a view illustrating a processing procedure example of the storage area creation process. The storage area creation process illustrated in FIG. 15 is a process of creating a new storage area 107 based on a storage area creation instruction, and corresponds to the processing in Step S1405 in FIG. 14 and Step S1904 in FIG. 19.

According to FIG. 15, first, the storage area creation/deletion program 118 of the management node 101 receives the storage area creation instruction (Step S1501). Next, the storage area creation/deletion program 118 searches the cluster configuration management table 121 and selects two nodes having a tier that matches a tier specified in the storage area creation instruction (Step S1502). It is assumed that the "high tier" is specified in this example, and in this case, the management node 101 and the normal node 102 are selected.

Next, the storage area creation/deletion program 118 searches the storage device management table 125 of the management node 101, and selects two unused addresses in the storage devices 215 of the nodes (the management node 101 and the normal node 102) selected in Step S1502 (Step S1503).

Then, the storage area creation/deletion program 118 creates a new record in the storage area management table 124 of the management node 101, and registers information of the nodes selected in Step S1502 and information of the storage devices having the addresses selected in Step S1503 in the record (Step S1504).

Next, the storage area creation/deletion program 118 performs a configuration propagation process (Step S1505). Details of the configuration propagation processing will be described later with reference to FIG. 16. Thereafter, the storage area creation/deletion program 118 issues a capacity information update process instruction of instructing the pool management program 120 of the management node 101 to update capacity information in the pool management table 122 (Step S1506).

When receiving the capacity information update process instruction (Step S1507), the pool management program 120 of the management node 101 decreases the unused capacity (the high-tier unused capacity 1224 in this example) and increases the used capacity (the high-tier used capacity 1223 in this example) by the capacity of the newly created storage area 107 in the pool management table 122 (Step S1507). Thereafter, the pool management program 120 notifies the storage area creation/deletion program 118 of a completion response (Step S1509).

When receiving the completion response of the capacity information update instruction from the pool management program 120 (Step S1510), the storage area creation/deletion program 118 determines that the creation of the storage area 107 has been completed, and notifies an issuance source to which the storage area creation instruction has been issued (for example, the front-end I/O processing program 113 in the case of the storage area creation process of Step S1405 in FIG. 14) of the completion response (Step S1511) to end the storage area creation process.

Although two nodes and the two storage devices 215 are selected in Steps S1502 and S1503, respectively, since the case where the storage area 107 is made redundant by mirroring has been taken as an example in the above description, the number more than two may be selected, and a plurality of storage areas 107 may be created at the same time in the case of adopting another RAID or erasure coding in the storage system 100.

Figure 16:
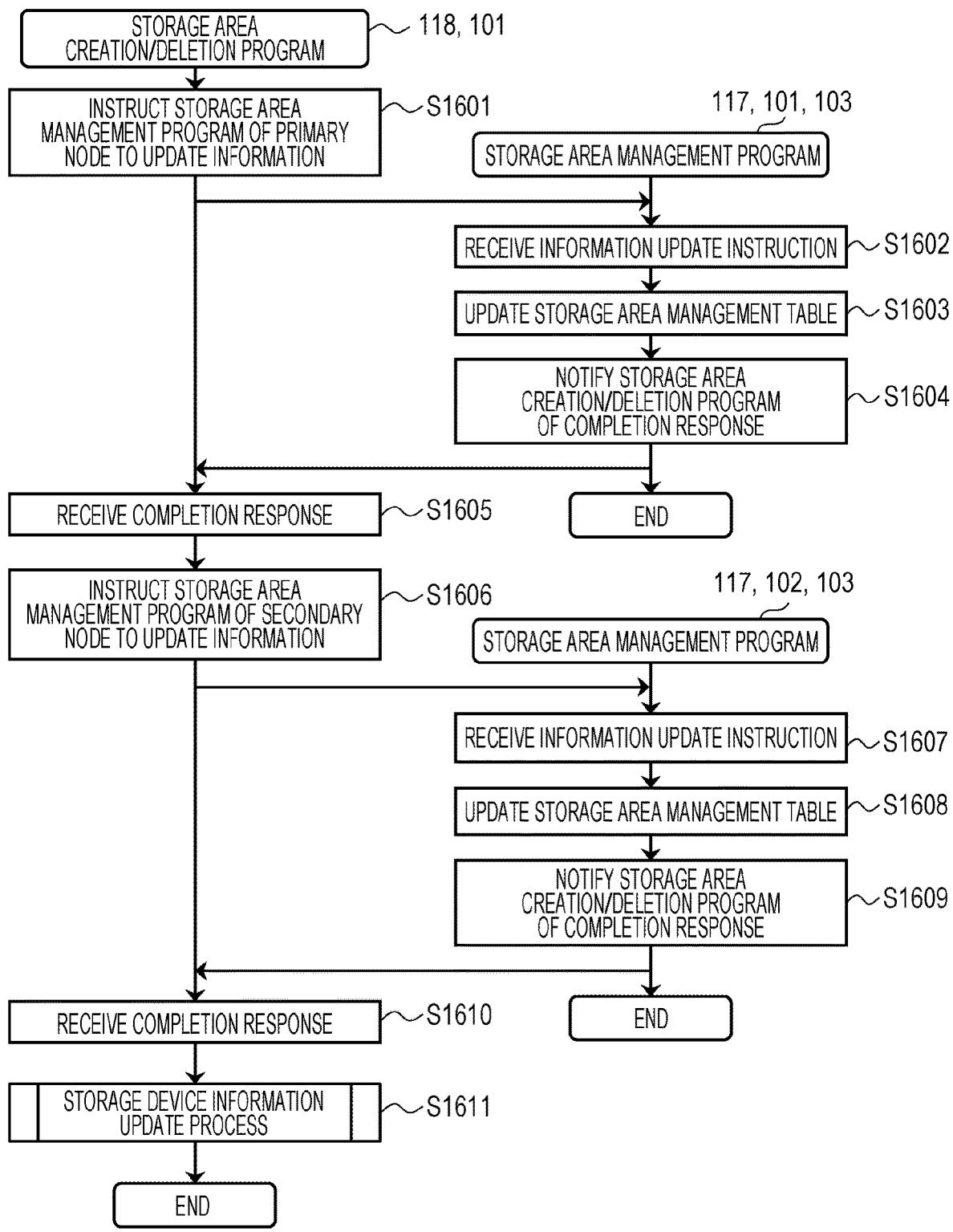
FIG. 16 is a view illustrating a processing procedure example of a configuration propagation process.

FIG. 16 is a diagram illustrating a processing procedure example of the configuration propagation process. The configuration propagation process illustrated in FIG. 16 is a process of transmitting configuration information determined by the management node 101 to related nodes (the normal nodes 102 and the lower nodes 103), and corresponds to the processing in Step S1505 in FIG. 15 and Step S2004 in FIG. 20.

According to FIG. 16, first, the storage area creation/deletion program 118 of the management node 101 issues an information update instruction to the storage area management program 117 running in a primary node configuring the storage area 107 (Step S1601).

A combination of the primary node and a secondary node constituting the storage area 107 can be recognized by referring to the storage area management table 124. Specifically, when referring to the storage area management table 124 in FIG. 9, the primary node is the management node 101 (node ID "1") and the secondary node is the normal node 102 (node ID "2") in a case where a tier of the storage area 107 has the high tier, and the primary node is the lower node 103 (node ID "3"), and the secondary node is the lower node 103 (node ID "4") in the case where a tier of the storage area 107 is the low tier.

Next, when receiving the information update instruction from the storage area creation/deletion program 118 (Step S1602), the storage area management program 117 of the primary node updates the storage area management table 124 of the own node based on information (argument) specified by the information update instruction (Step S1603). Thereafter, the storage area management program 117 of the primary node notifies the storage area creation/deletion program 118 of the management node 101 of a completion response (Step S1604).

Then, the storage area creation/deletion program 118 of the management node 101 receives the completion response from the storage area management program 117 of the primary node (Step S1605).

Through the processing in Steps S1601 to S1605, the information update of the storage area management table 124 for the primary node is completed. Next, the same processing as in Steps S1601 to S1605 is performed for the secondary node (Steps S1606 to S1610). Although the detailed description is omitted to avoid repetition, the information update of the storage area management table 124 for the secondary node is completed by the processing of Steps S1606 to S1610.

After the end of Step S1610, the storage area creation/deletion program 118 executes a storage device information update process (Step S1611). Details of the storage device information update process will be described later with reference to FIG. 17.

Figure 17:
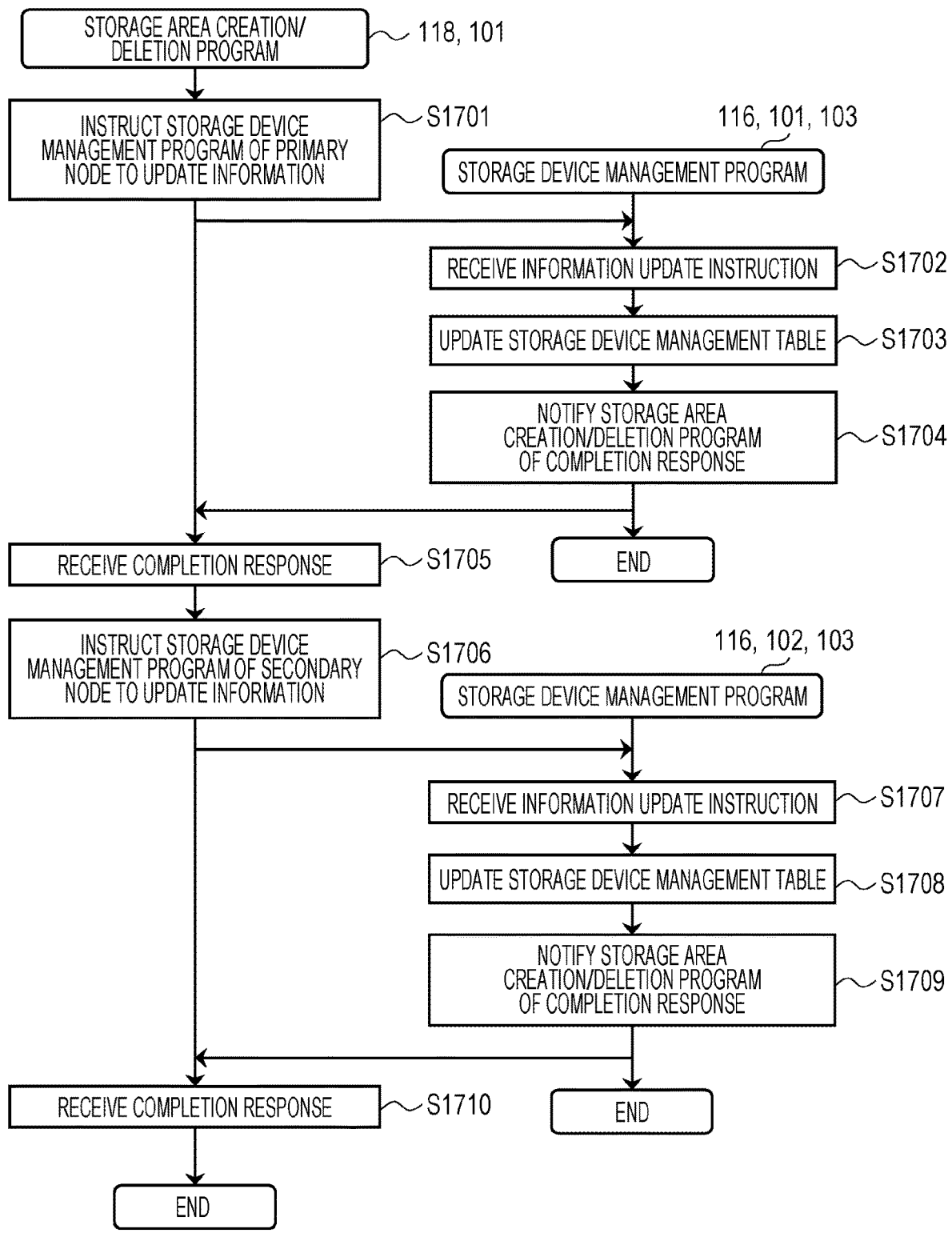
FIG. 17 is a view illustrating a processing procedure example of a storage device information update process.

FIG. 17 is a view illustrating a processing procedure example of the storage device information update process. The storage device information update process illustrated in FIG. 17 is a process of transmitting the configuration information determined by the management node 101 to the primary node and the secondary node and updating the information of the storage device management table 125, and corresponds to the processing of Step S1611 in FIG. 16.

According to FIG. 17, first, the storage area creation/deletion program 118 of the management node 101 issues an information update instruction to the storage device management program 116 running in a primary node configuring the storage area 107 (Step S1701).

Next, when receiving the information update instruction from the storage area creation/deletion program 118 (Step S1702), the storage device management program 116 of the primary node updates the drive ID 1252 and the state 1254 for the address 1253 specified by the information update instruction in the storage device management table 125 of the own node (Step S1703). Specifically, regarding the update of the state 1254 in Step S1703, "in use" is changed to "unused" when the storage area 107 has been deleted, and "unused" is changed to "in use" when the storage area 107 has been created. Thereafter, the storage device management program 116 of the primary node notifies a completion response to the storage area creation/deletion program 118 of the management node 101 (Step S1704).

Then, the storage area creation/deletion program 118 of the management node 101 receives the completion response from the storage device management program 116 of the primary node (Step S1705).

Through the processing of Steps S1701 to S1705, the information update of the storage device management table 125 for the primary node is completed. Next, the same processing as in Steps S1701 to S1705 is performed for the secondary node (Steps S1706 to S1710). Since the information update of the storage device management table 125 for the secondary node is completed by the processing of Steps S1706 to S1710, the storage device information update process is ended.

Figure 18:
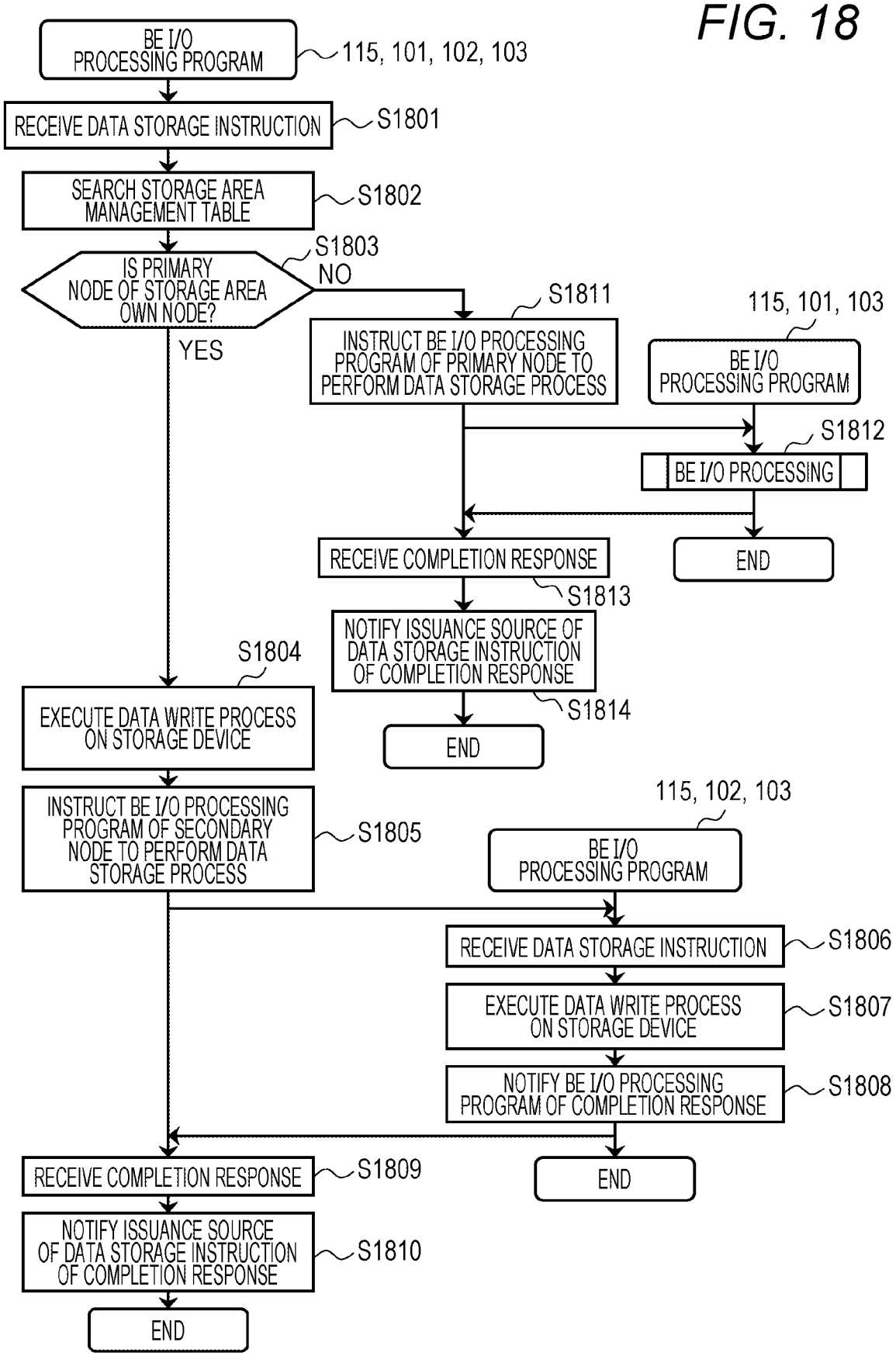
FIG. 18 is a view illustrating a processing procedure example of back-end I/O processing.

FIG. 18 is a view illustrating a processing procedure example of the back-end I/O processing. The back-end I/O processing illustrated in FIG. 18 is processing executed during the I/O processing illustrated in FIG. 14 (see Step S1410), and is executed in response to a data storage instruction from the front-end I/O processing program 113.

According to FIG. 18, first, the back-end I/O processing program 115 receives a data storage instruction (Step S1801). Next, the back-end I/O processing program 115 searches the storage area management table 124 in the own node using an ID of the storage area 107 given as an argument in the data storage instruction (Step S1802), and determines whether a primary node of the storage area 107 is the own node (Step S1803). The processing proceeds to Step S1804 when the primary node of the storage area 107 is the own node in Step S1803 (YES in Step S1803), and proceeds to Step S1811 when the primary node of the storage area 107 is another node (NO in Step S1803).

First, a case where the primary node is the own node in Step S1803 will be described. In Step S1804, the back-end I/O processing program 115 performs a data write process on the storage device 215 serving as a primary drive in the own node. Thereafter, the back-end I/O processing program 115 instructs the back-end I/O processing program 115 of the secondary node to perform a data storage process (Step S1805).

When receiving a data storage instruction issued in Step S1805 (Step S1806), the back-end I/O processing program 115 of the secondary node performs the data write process on the storage device 215 serving as a secondary drive in a secondary node (Step S1807). Thereafter, the back-end I/O processing program 115 of the secondary node notifies the back-end I/O Processing program 115 of the primary node of a completion response (Step S1808).

Then, the back-end I/O processing program 115 of the primary node receives the completion response notified in Step S1808 (Step S1809). Through the processing so far, the data write can be performed on the primary node and the secondary node of the storage area 107 given as arguments in the data storage instruction, and thus, the back-end I/O processing program 115 of the primary node notifies an issuance source of the data storage instruction (the front-end I/O processing program 113 in the case of Step S1410 in FIG. 14, or the back-end I/O processing program 115 in the case of Step S1812 to be described later) of the completion response (Step S1810), and ends the back-end I/O processing.

Next, a case where the primary node is another node in Step S1803 will be described. At this time, the back-end I/O processing program 115 instructs the back-end I/O processing program 115 of the primary node existing in a node different from the own node to perform the data storage process in Step S1811. Upon receiving the instruction in Step S1811, the back-end I/O processing program 115 of the primary node executes the back-end I/O processing illustrated in FIG. 18 from Step S1801. However, with such a transfer destination, the processing is executed at the branch where the determination in Step S1803 is YES since the own node of the transfer destination is the primary node.

When the back-end I/O processing of the transfer destination is ended, the back-end I/O processing program 115 of the source node receives a completion response from the back-end I/O processing program 115 of a primary node of the transfer destination (Step S1813). Then, the back-end I/O processing program 115 waits for the operation in Step S1813, notifies the front-end I/O processing program 113 that is an issuance source of the data storage instruction of the completion response (Step S1814), and ends the back-end I/O processing.

Since the back-end I/O processing is executed as described above, the back-end I/O processing program 115 can perform the data write on the primary node and the secondary node of the storage area 107 given as arguments in the data storage instruction.

FIG. 19 is a view illustrating a processing procedure example of the tier control process. The tier control processing illustrated in FIG. 19 is a process in which the tier control program 114 confirms whether the storage area 107 satisfies an eligibility condition defined for each tier based on an I/O count with respect to the storage area 107 within a predetermined time and changes to a tier that satisfies the eligibility condition when the eligibility condition is not satisfied, and is executed periodically (for example, every day) in the management node 101 and the normal node 102 started by the tier control program 114.

According to FIG. 19, first, the tier control program 114 confirms the tier 1234 and the I/O counter 1235 with reference to the volume management table 123 (Step S1901). The tier control program 114 determines whether there is the storage area 107 that does not satisfy the eligibility condition of the tier to which the storage area 107 belongs by searching in Step S1901 (Step S1902).

Supplementary description will be given on a determination criterion of Step S1902. In the present embodiment, an appropriate range of the I/O count in a fixed time is defined for each of the tiers (the high tier and the lower tier), and this is referred to as "tier eligibility condition". Specifically, in this example, the eligibility condition of the high tier is that the I/O counter 1235 within a fixed time is equal to or more than "100", and the eligibility condition of the low tier is that the I/O counter 1235 within a fixed time is less than "100". At this time, in the determination of Step S1902, it is possible to confirm the existence of the storage area 107 that does not satisfy the eligibility condition of the tier to which the storage area 107 belongs by comparing the I/O counter 1235 within a fixed time with the threshold "100" based on the classification of the tier 1234, for each record of the volume management table 123.

When there is the storage area 107 that does not satisfy the eligibility condition of the tier to which the storage area 107 belongs in Step S1902 (YES in Step S1902), the process proceeds to Step S1903. On the other hand, when all the created storage areas 107 satisfy the eligibility conditions of the tiers to which the storage areas 107 belong, respectively, in Step S1902 (NO in Step S1902), no special processing is required, and thus, the tier control process is ended.

In Step S1903, the tier control program 114 issues a storage area creation instruction to the storage area creation/deletion program 118 of the management node 101 using the tier satisfying the eligibility condition as an argument, for the storage area 107 determined to be inappropriate in Step S1902.

Upon receiving the storage area creation instruction in Step S1903, the storage area creation/deletion program 118 performs the storage area creation process to newly create the storage area 107 in the tier that satisfies the eligibility condition (Step S1904). The storage area creation process has been described above with reference to FIG. 15.

Thereafter, when receiving a completion response of the storage area creation process (Step S1905), the tier control program 114 copies data of the storage area 107 not satisfying the eligibility condition in Step S1902 to the storage area 107 of the tier newly created in Step S1904 (Step S1906). Then, the tier control program 114 issues an instruction to delete the storage area 107 serving as a copy source to the storage area creation/deletion program 118 of the management node 101 (Step S1907).

Upon receiving the deletion instruction in Step S1907, the storage area creation/deletion program 118 performs a storage area deletion process (Step S1908). Details of the storage area deletion process will be described later with reference to FIG. 20.

Thereafter, when receiving a completion response of the storage area deletion process (Step S1909), the tier control program 114 ends the tier control process.

Since the tier control process is executed as described above, the storage area 107 can be re-arranged in accordance with the tier eligibility condition in the storage system 100 of the present embodiment, and thus, an effect of enhancing processing performance can be expected by promoting efficient use of resources in the entire storage system 100.

More specifically, as a premise of the tier, a node having a relatively high-performance storage device 215 such as an SSD is set as the normal node 102, and a storage area created from the storage device 215 is placed in the high tier. On the other hand, a node having a low-functional storage device 215 such as an HDD is set as the lower node 103, and a storage area 107 created from the storage device 215 is placed in the low tier. Since the above-described tier control process is executed with such a configuration, there is no need to store data in the high tier when the I/O counter is less than 100 (the number of accesses is small) in the storage area 107 of the high tier, and thus, the storage area can be moved to the low-functional low tier. As a result, it is possible to prevent the performance of the entire storage system from deteriorating when the low-functional storage device is used. In addition, when the I/O counter is 100 or more (the number of accesses is large) in the storage area 107 in the low tier, the processing speed of I/O increases by storing the data in the high-functional high tier so that the processing capability of the entire system is enhanced.

Although the tier control using the I/O counter within a fixed time has been described as an example of the tier eligibility condition in this example, the present embodiment is not limited thereto. The tier control may be performed using an index such as a ratio of write processing and read processing in the I/O processing, an index such as whether or not the volume 105 and data exist in the same node, and the like. In addition, the process of deleting the storage area 107 of the copy source after data copy (Steps S1907 to S1908) may not be necessarily performed.

Figure 20:
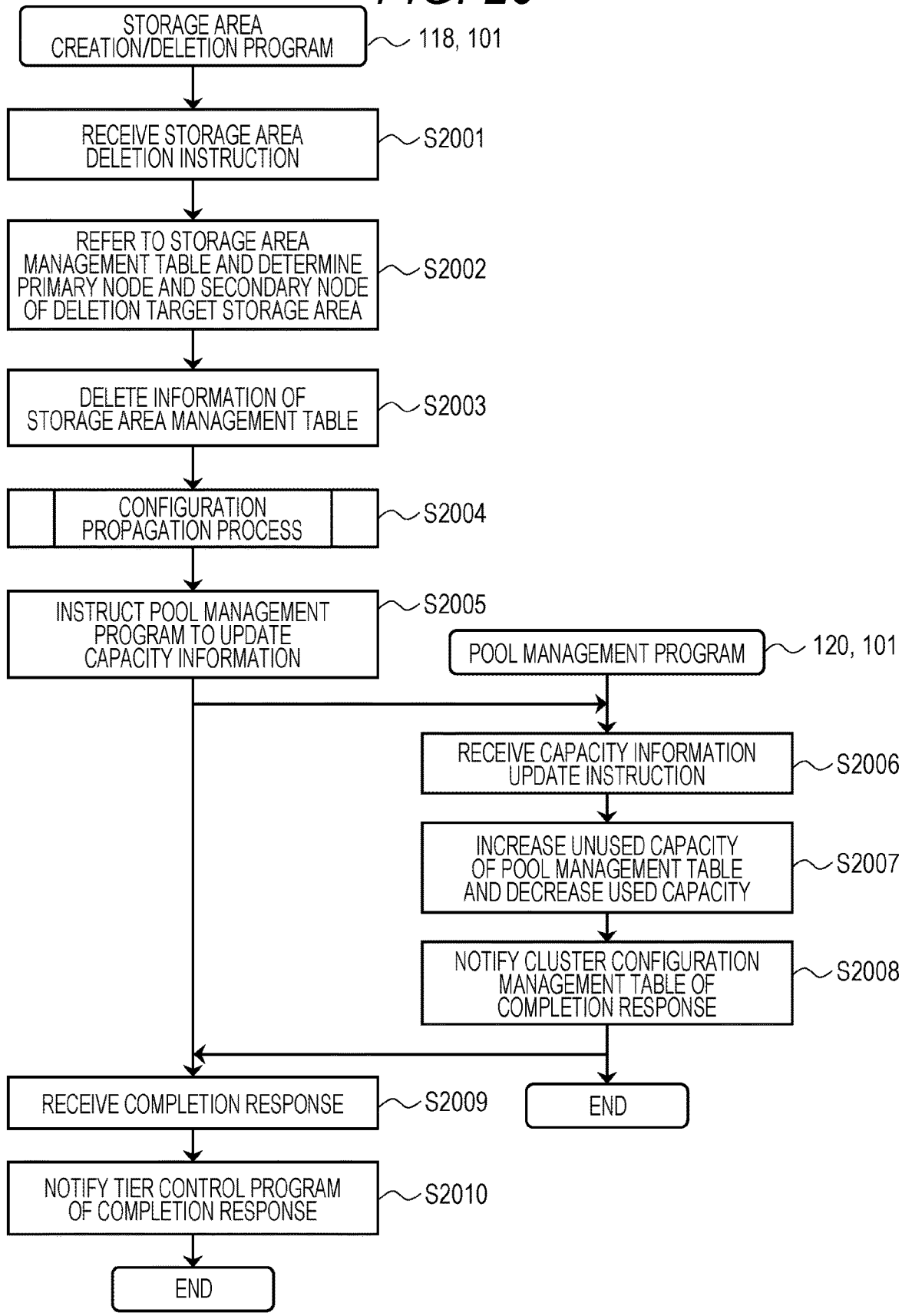
FIG. 20 is a view illustrating a processing procedure example of a storage area deletion process.

FIG. 20 is a view illustrating a processing procedure example of the storage area deletion process. The storage area deletion process illustrated in FIG. 20 is a process of deleting the storage area 107 based on a storage area deletion instruction, and corresponds to the processing in Step S1908 in FIG. 19.

According to FIG. 20, first, the storage area creation/deletion program 118 of the management node 101 receives the storage area deletion instruction from the tier control program 114 (Step S2001). Next, the storage area creation/deletion program 118 refers to the storage area management table 124 and specifies a primary node and a secondary node associated with a storage area ID specified by the storage area deletion instruction (Step S2002). Then, the storage area creation/deletion program 118 deletes a record corresponding to the specified contents of Step S2002 from the storage area management table 124 of the management node 101 (Step S2003). Thereafter, the storage area creation/deletion program 118 uses the configuration propagation process illustrated in FIG. 16 for the above deletion (Step S2004).

Next, the storage area creation/deletion program 118 issues a capacity information update process instruction of instructing the pool management program 120 to update capacity information in the pool management table 122 (Step S2005).

When receiving the capacity information update process instruction (Step S2006), the pool management program 120 of the management node 101 increases an unused capacity and decreases a used capacity in the pool management table 122 by the deleted storage area 107 (Step S2007). Thereafter, the pool management program 120 notifies the storage area creation/deletion program 118 of a completion response (Step S2008).

When receiving the completion response of the capacity information update instruction from the pool management program 120 (Step S2009), the storage area creation/deletion program 118 determines that the deletion of the storage area 107 has been completed, notifies the tier control program 114 that is an issuance source of the storage area deletion instruction of the completion response (Step S2010), and ends the storage area deletion process.

As described above, the program to be started in each node can be switched in accordance with the attribute specified by the user for each node according to the storage system 100 of the present embodiment, and thus, the amount of CPU and memory required for the node to be added can be reduced at the time of adding the node to the storage cluster.

More specifically, in the storage system 100 according to the present embodiment, the I/O processing is divided into the front-end processing (front-end I/O processing) that performs the interchange with the host 201 and the back-end processing (back-end I/O processing) that performs the access (data storage) to the storage device 215, and only the program that executes the back-end I/O processing is started without starting the program that executes the front-end I/O processing in the node for which the attribute indicating the lower level ("lower" in this example) has been specified when executing the I/O processing in the storage system. Therefore, the amount of CPU and memory for the front-end I/O processing is not required.

Further, in the storage system 100 according to the present embodiment, the tier control is executed such that the storage pool 106 provided by clustering the storage devices 215 of the respective nodes is classified into the plurality of tiers having different allowable frequencies of I/O processing (in this example, "high tier/low tier"), the storage area 107 created from the storage device 215 provided in the node for which the upper attribute (in this example, "management" or "normal") has been specified is handled at the high tier of the storage pool 106, and the storage area 107 created from the storage device 215 of the node for which the attribute indicating the lower level ("lower" in this example) has been specified is handled in the low tier of the storage pool 106. Since such tier control is performed, it is possible to expect that the performance of the entire storage system 100 is prevented from deteriorating and the processing capability of the entire system is enhanced by specifying the attribute of the node in accordance with the performance of the storage device 215 in the storage system 100 according to the present embodiment. Specifically, for example, the attribute "management" or "normal" is specified for the node having the relatively high-performance storage device 215 such as the SSD, and the attribute "lower" is specified for the node having the relatively low-performance storage device 215 such as the HDD. Thus, the storage area 107 using the high-performance storage device 215 can be used for the high tier with a high I/O frequency, and the storage area 107 using the low-performance storage device 215 can be used for the low tier with a low I/O frequency. For example, a predetermined criterion regarding processing performance may be provided in order to distinguish between the low performance and the high performance of the storage device 215, and it may be determined that the storage device 215 is the low-performance storage device if the storage device 215 falls short of this predetermined criterion.

In addition, in the storage system 100 according to the present embodiment, even a storage node that does not have the SAN port 213 or the LAN port 214 can be incorporated into the storage system 100 and operated by specifying the attribute "lower" for the storage node as in the lower node 103 illustrated in FIG. 2. That is, even the low-functional node in terms of the configuration can be added to the storage system 100, and thus, an effect of suppressing cost required for node addition can be expected.

(2) Second Embodiment

Hereinafter, a storage system 300 according to a second embodiment of the invention will be described. In the description of the present embodiment, it is assumed that a portion that is not particularly described has the same configuration and performs the same processing as that in the first embodiment.

In the present embodiment, how to handle functions other than I/O processing of the storage system according to the invention will be described using a snapshot as an example. The snapshot is a function of creating a snapshot volume configured to store data at a certain point in time of a certain primary volume, and storing a difference from the primary volume in the snapshot volume.

Figure 21:
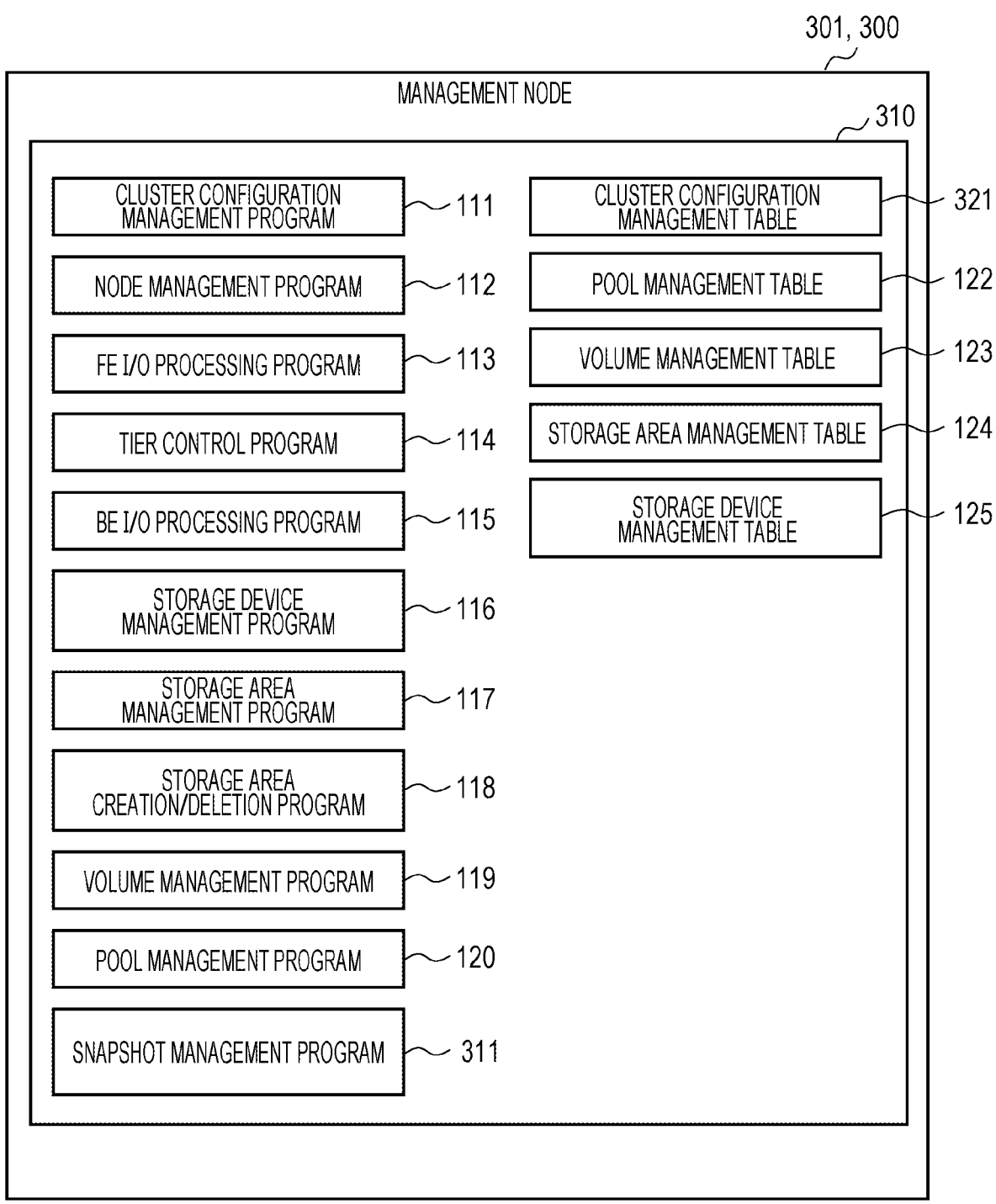
FIG. 21 is a diagram illustrating an example of a computer program executed by a management node in a second embodiment.

FIG. 21 is a diagram illustrating an example of a computer program executed by a management node in the second embodiment. The storage system 300 according to the second embodiment includes a management node 301 instead of the management node 101 of the first embodiment. As illustrated in FIG. 21, a memory 310 of the management node 301 stores a snapshot management program 311 for management of the snapshot function in addition to a plurality of computer programs (see FIG. 3) stored in the memory 212 of the management node 101. In addition, tables stored in the memory 312 are the same as the tables stored in the memory 212, but a cluster configuration management table 321 is different from the cluster configuration management table 121 in terms of a program to be started.

As the difference from the storage system 100 according to the first embodiment, in the storage system 300 according to the present embodiment, a user can specify an attribute as an argument regarding presence/absence of an accessory function (in this example, the snapshot function is exemplified as the accessory function relating to the management of the volume 105) as well as the node attributes (upper/lower) relating to the I/O processing.

FIG. 22 is a view illustrating a configuration example of the cluster configuration management table illustrated in FIG. 21. The cluster configuration management table 321 is held in the management node 301 and has a record for each node in the storage system 300. A configuration (a node ID 3211, an attribute 3212, a startup program 3213) of the cluster configuration management table 321 illustrated in FIG. 21 is the same as the configuration of the cluster configuration management table 121 illustrated in FIG. 6 in the first embodiment. As illustrated in a record of a node ID "1" in FIG. 22, the snapshot management program 311 is loaded only in the management node 301.

In the storage system 300 configured as described above, when the node addition is instructed, the cluster configuration management program 111 determines a program to be loaded in an additional node according to a specified attribute of the node similarly to the first embodiment (Step S1303 in FIG. 11).

As described above, when volume creation is instructed by a user, the necessity of snapshot creation can be given as an argument in the storage system 300. When it has been instructed that the snapshot creation is required by the argument in a volume creation instruction, the cluster configuration management program 111 issues the volume creation instruction to a node (the management node 301 in this example) in which the snapshot management program 311 is running in the processing of Step S1303 in FIG. 13. Since such processing is performed, the storage system 300 can be operated using only a necessary amount of memory according to the loaded function.

In this manner, the accessory function (for example, the snapshot function) relating to the management of the volume 105 can also be specified as the attribute of the node in the storage system 300 according to the second embodiment, in addition to the effects obtained by the first embodiment. Further, the management function of the volume 105 is divided in accordance with the attribute of the accessory function, and the program to be started is switched for each node, so that the storage system 300 can be configured to consume only the minimum amount of CPU and memory required for the accessory function.

Although the plurality of embodiments relating to the invention have been described above, these are examples for describing the invention, and there is no intention to limit the scope of the invention only to the embodiments. The invention can be implemented in various other forms. For example, instead of switching whether to start the snapshot program, whether to start a synchronous copy program with another storage system may be switched, or a new node attribute, such as a snapshot node, may be set for a node having the snapshot program, and the program to be started may be switched accordingly.

What is claimed is:

1. A storage system that configures a storage cluster using a plurality of nodes, the nodes comprising:
a storage device that stores data;
a memory; and
a processor that runs a program configured to perform I/O processing on the storage device,
wherein attributes of the nodes are specified as first attribute nodes and second attribute nodes, and
the I/O processing in the nodes is executed as a plurality of processes including front-end I/O processing executed by any of the first attribute nodes and back-end I/O processing executed by the first and second attribute nodes having the storage device that stores data relating to the I/O processing, wherein
the attribute of the node is specified by a user when adding the node to the storage cluster.

2. The storage system according to claim 1, wherein
the first attribute nodes are upper nodes for which the attribute at an upper level is specified, the second attribute nodes are lower nodes for which the attribute at a lower level is specified, and the upper nodes include a management node, and
the management node specifies the upper node responsible for the front-end I/O processing in the I/O processing of the lower node with respect to the storage device.

3. The storage system according to claim 2, wherein
a storage pool provided from the storage cluster is managed by being divided into a plurality of levels of tiers, and
the processor of the upper node executes tier control to control any tier of the storage pool in which the storage area provided by the storage device of each of the nodes is to be handled in accordance with the attribute of each of the nodes.

4. The storage system according to claim 3, wherein
the tiers of the storage pool include a high tier for storage of data with an I/O frequency above a first threshold and a low tier for storage of data with an I/O frequency below a second threshold.

5. The storage system according to claim 4, wherein
in the tier control, the processor of the upper node handles the storage area provided by the storage device of the lower node only in the low tier.

6. The storage system according to claim 3, wherein
an eligibility condition based on an I/O frequency is set for each of the tiers of the storage pool, and
in the tier control, the processor of the upper node confirms whether the storage area satisfies the eligibility condition in a current tier, and copies data in the storage area to another tier that satisfies the eligibility condition among the tiers if the storage area that does not satisfy the eligibility condition in the current tier exists.

7. The storage system according to claim 6, wherein
in the tier control, the processor of the upper node copies data of the storage area that does not satisfy the eligibility condition in a current tier to another tier that satisfies the eligibility condition among the tiers, and then, deletes the data of a copy source.

8. The storage system according to claim 5, wherein
if a node to be added to the storage cluster has the storage device with low performance below a predetermined standard, the attribute at the lower level is specified for the node.

9. The storage system according to claim 5, wherein
when a node to be added to the storage cluster does not have an interface required to execute the front-end I/O processing and has an interface required to execute the back-end I/O processing, the attribute at the lower level is specified for the node.

10. A storage system
that configures a storage cluster using a plurality of nodes, the nodes comprising:
a storage device that stores data;
a memory; and
a processor that runs a program configured to perform I/O processing on the storage device,
wherein attributes of the nodes are specified as first attribute nodes and second attribute nodes, and
the I/O processing in the nodes is executed as a plurality of processes including front-end I/O processing executed by any of the first attribute nodes and back-end I/O processing executed by the first and second attribute nodes having the storage device that stores data relating to the I/O processing,
wherein
it is possible to specify a first type of attribute relating to I/O processing and a second type of attribute relating to an accessory function of managing a volume, which is created in a storage pool, as the attribute of each of the nodes, and the processor of each of the nodes switches the program to be started on the own node in accordance with the first type of attribute and the second type of attribute specified for the own node.

11. The storage system according to claim 1, wherein
in the node for which the attribute at a top level for management is specified, the memory holds resource management information on all the nodes of the plurality of nodes, and
in the node for which the attribute at an upper or lower level is specified, the memory holds resource management information on the own node.

12. A node management method performed by a storage system that configures a storage cluster using a plurality of nodes,
wherein the nodes include: a storage device that stores data; a memory; and a processor that runs a program configured to perform I/O processing on the storage device,
attributes of the nodes are specified as first attribute nodes and second attribute nodes,
the I/O processing in the nodes is executed as a plurality of processes including front-end I/O processing executed by any of the first attribute nodes and back-end I/O processing executed by the first and second attribute nodes having the storage device that stores data relating to the I/O processing, and wherein
the attribute of the node is specified by a user when adding the node to the storage cluster.

13. The node management method according to claim 12, wherein
the first attribute nodes are upper nodes for which the attribute at an upper level is specified, the second attribute nodes are lower nodes for which the attribute at a lower level is specified, and the upper nodes include a management node, and
the management node specifies the upper node responsible for the front-end I/O processing in the I/O processing of the lower node with respect to the storage device.

14. The node management method according to claim 13, wherein
a storage pool provided from the storage cluster is managed by being divided into a plurality of levels of tiers including a high tier for storage of data with an I/O frequency above a first threshold and a low tier for storage of data with an I/O frequency below a second threshold, and
the processor of the upper node executes tier control to control any tier of the storage pool in which a storage area of data provided by the storage device of each of the nodes to the storage pool is to be handled in accordance with the attribute of each of the nodes.

15. The node management method according to claim 14, wherein
an eligibility condition based on an I/O frequency is set for each of the tiers of the storage pool, and
in the tier control, the processor of the upper node confirms whether the storage area satisfies the eligibility condition in a current tier, and copies data in the storage area to another tier that satisfies the eligibility condition among the tiers if the storage area that does not satisfy the eligibility condition in the current tier exists.

16. The node management method according to claim 12, wherein
it is possible to specify a first type of attribute relating to I/O processing and a second type of attribute relating to an accessory function of managing a volume created in a storage pool, as the attribute of each of the nodes, and
the processor of each of the nodes switches the program to be started on the own node in accordance with the first type of attribute and the second type of attribute specified for the own node.

* * * * *